(12) United States Patent
Lim

(10) Patent No.: US 11,565,186 B2
(45) Date of Patent: Jan. 31, 2023

(54) METHOD AND DEVICE FOR ACQUIRING PROBABILITY INFORMATION OF GACHA SYSTEM, AND COMPUTER PROGRAM

(71) Applicant: NEXON KOREA CORPORATION, Seongnam-si (KR)

(72) Inventor: Tae Hyun Lim, Seoul (KR)

(73) Assignee: NEXON KOREA CORPORATION, Seongnam-si (KR)

( * ) Notice: Subject to any disclaimer, the term of this patent is extended or adjusted under 35 U.S.C. 154(b) by 118 days.

(21) Appl. No.: 17/046,546

(22) PCT Filed: Apr. 13, 2018

(86) PCT No.: PCT/KR2018/004311
§ 371 (c)(1),
(2) Date: Oct. 9, 2020

(87) PCT Pub. No.: WO2019/198846
PCT Pub. Date: Oct. 17, 2019

(65) Prior Publication Data
US 2021/0205714 A1 Jul. 8, 2021

(30) Foreign Application Priority Data
Apr. 12, 2018 (KR) .......................... 10-2018-0042919

(51) Int. Cl.
*A63F 13/85* (2014.01)
*A63F 13/34* (2014.01)
*A63F 13/69* (2014.01)

(52) U.S. Cl.
CPC .............. *A63F 13/85* (2014.09); *A63F 13/34* (2014.09); *A63F 13/69* (2014.09); *A63F 2300/401* (2013.01)

(58) Field of Classification Search
None
See application file for complete search history.

(56) References Cited

U.S. PATENT DOCUMENTS

2018/0096752 A1 4/2018 Ovalle

FOREIGN PATENT DOCUMENTS

JP 2018-015121 A 2/2018
KR 10-1275662 B1 6/2013
(Continued)

OTHER PUBLICATIONS

International Search Report and Written Opinion dated Jan. 28, 2019, in International Patent Application No. PCT/KR2018/004311 filed Apr. 13, 2018 , 10 pages.
(Continued)

*Primary Examiner* — Kevin Y Kim
(74) *Attorney, Agent, or Firm* — Kilpatrick Townsend & Stockton

(57) ABSTRACT

A method of acquiring probability information of a gacha system includes: acquiring, by a first user terminal, second gacha event information that is information about a gacha event occurring in a second user terminal; acquiring, by the first user terminal, third gacha event information that is information about a gacha event occurring in a third user terminal; acquiring probability information of the gacha system based on the acquired second gacha event information and third gacha event information; and displaying the acquired probability information of the gacha system.

17 Claims, 20 Drawing Sheets

(56) References Cited

FOREIGN PATENT DOCUMENTS

| KR | 10-1569645 B1 | 11/2015 |
|---|---|---|
| KR | 10-1718398 B1 | 3/2017 |

OTHER PUBLICATIONS

Lee, H. "[Blockchain and Games ②] 12 possibilities of technological advancement" INVEN, Jan. 29, 2018, retrieved on Sep. 22, 2020 from website: http://www.inven.co.kr/webzine/news/?news=193213, 24 pages.

Mutoh, P., Millimas Notice about "Gasha Appearance Card Probability Display", Mutopro.egloos.com, Sep. 23, 2016, retrieved on Sep. 22, 2020 from website: http://mutopro.egloos.com/9882956, 13 pages.

METHOD AND DEVICE FOR ACQUIRING PROBABILITY INFORMATION OF GACHA SYSTEM, AND COMPUTER PROGRAM

TECHNICAL FIELD

The present disclosure relates to a method of acquiring probability information of a gacha system, and more particularly, to a method of acquiring probability information of a gacha system by sharing information about the gacha system between user terminals.

BACKGROUND ART

With the development of communication technology and computing devices, the number of users enjoying online games has increased explosively. In general, various online games provide various types of items and interfaces for enabling users to directly control game objects such as characters, thereby allowing the users to feel interest in the games.

In an online-based game of the related art, a user may be provided with a certain item when the user achieves a certain goal, or the user may purchase a certain item by paying a certain amount of money. However, recently, even in the case of providing an item to a user, a gacha system has been used to arouse the user's interest.

The gacha system refers to a random pick-up system for drawing products, items, or the like. In general, the gacha system is used in a sense similar to a random box, a capsule machine, or the like, and the user may not predict which item may be acquired. That is, the user using the gacha system purchases an opportunity to draw a product or item, instead of directly purchasing a desired product or item.

However, it has been difficult for users to acquire probability information of a game's gacha system, and the number of times being used by the users has decreased because the users' confidence in the probability information provided by a game service provider has been significantly low.

Thus, an improved gacha system, which may provide highly-reliable probability information of a gacha system and may arouse the user's interest, has been required.

DESCRIPTION OF EMBODIMENTS

Technical Problem

Provided is a method of providing reliable probability information of a gacha system.

Solution To Problem

A gacha system trustable by a user is provided by providing gacha probability information.

Advantageous Effects of Disclosure

A gacha system trustable by a user may be provided.

BEST MODE

Figure 1:
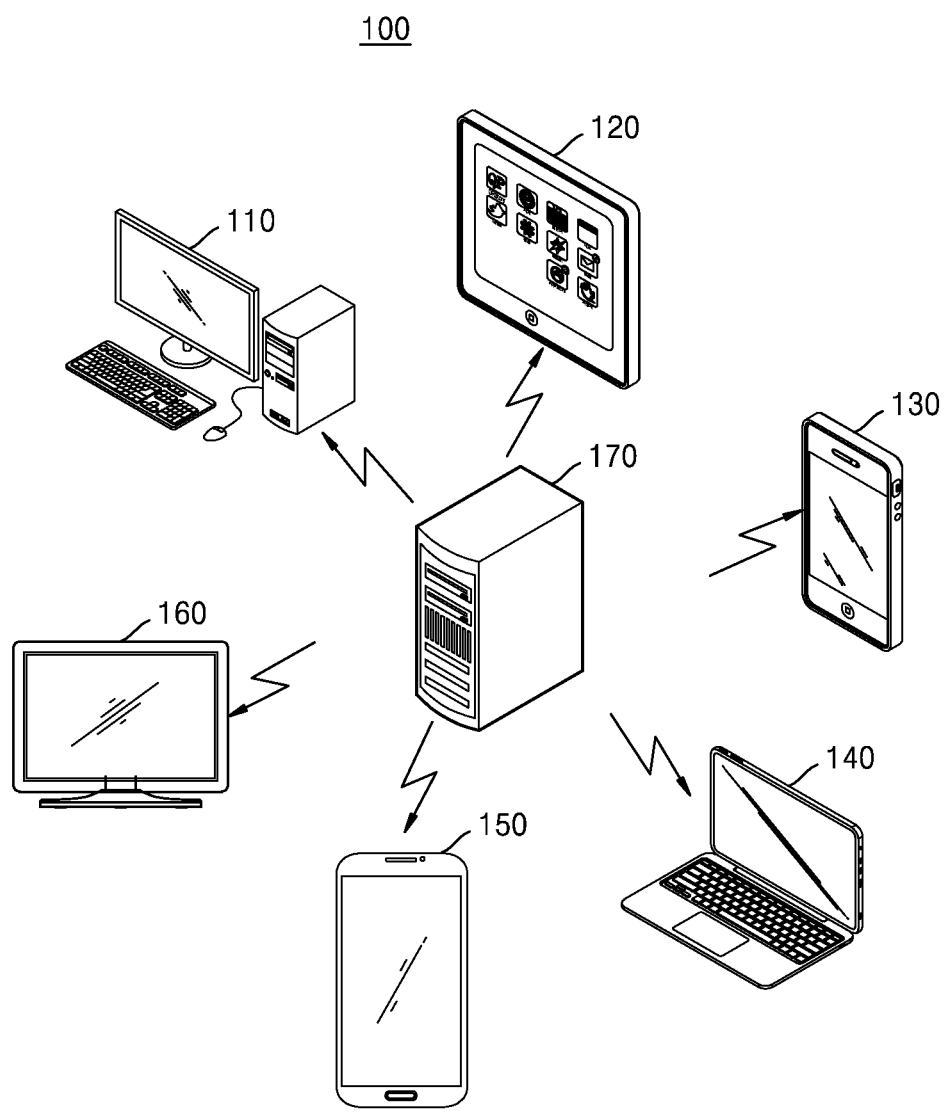
FIG. 1 illustrates an online game providing system including a server and a user terminal according to some embodiments.

According to some embodiments of the present disclosure, a method of acquiring probability information of a gacha system includes: acquiring, by a first user terminal, second gacha event information that is information about a gacha event occurring in a second user terminal; acquiring, by the first user terminal, third gacha event information that is information about a gacha event occurring in a third user terminal; acquiring probability information of the gacha system based on the acquired second gacha event information and third gacha event information; and displaying the acquired probability information of the gacha system.

The method may further include: transmitting a gacha event execution request; acquiring an execution result of the gacha event; and generating first gacha event information based on the execution result.

The second gacha event information may be included in a block constituting a blockchain that distributes and manages a ledger recording gacha event information, and the third gacha event information may be included in the block or a block different from the block among blocks constituting the blockchain.

The generating of the first gacha event information may include requesting a record of the first gacha event information into at least one block constituting the blockchain to a first node on a blockchain network.

The requesting of the record of the first gacha event information to the first node may include encrypting the first gacha event information and transmitting the encrypted first gacha event information to the first node.

The transmitting of the first gacha event information to the first node may include: generating a first hash value corresponding to the first gacha event information by applying the first gacha event information to a hash function for generating unique data about the first gacha event information; generating a first cryptogram representing a digital signature of the first gacha event information by encrypting the first hash value with a private key of a user that has executed the gacha event; and transmitting the first cryptogram together with the first gacha event information to the first node.

The second gacha event information or the third gacha event information may include at least one of probability information of the gacha system, game information related to the gacha system, a gacha event type, a gacha event execution time, gacha event execution account information, information of a user terminal in which a gacha event is executed, an item acquired according to a gacha event execution result, and the amount of game goods used to execute a gacha event.

The acquiring of the probability information of the gacha system may include calculating an acquisition probability of each of items acquirable in the gacha system, based on the second gacha event information and the third gacha event information.

At least one of an account corresponding to a user terminal that has generated the first gacha event information and a user account corresponding to the first node may be provided with certain game goods.

The method may further include: updating the acquired probability information of the gacha system based on additionally-acquired gacha event information; and displaying the updated probability information of the gacha system.

Some embodiments of the present disclosure may provide a computer-readable recording medium storing a program for implementing the above method.

According to some embodiments of the present disclosure, an apparatus for acquiring probability information of a gacha system includes: a communicator configured to acquire second gacha event information that is information about a gacha event occurring in a second user terminal and to acquire third gacha event information that is information about a gacha event occurring in a third user terminal; a processor configured to acquire probability information of the gacha system based on the acquired second gacha event information and third gacha event information; and a display configured to display the acquired probability information of the gacha system.

The communicator may transmit a gacha event execution request and acquire an execution result of the gacha event, and the processor may generate first gacha event information based on the execution result.

The second gacha event information may be included in a block constituting a blockchain that distributes and manages a ledger recording gacha event information, and the third gacha event information may be included in the block or a block different from the block among blocks constituting the blockchain.

The processor may control the communicator to request a record of the first gacha event information into at least one block constituting the blockchain to a first node on a blockchain network.

The processor may encrypt the first gacha event information and control the communicator to transmit the encrypted first gacha event information to the first node.

The processor may generate a first hash value corresponding to the first gacha event information by applying the first gacha event information to a hash function for generating unique data about the first gacha event information and generate a first cryptogram representing a digital signature of the first gacha event information by encrypting the first hash value with a private key of a user that has executed the gacha event, and the communicator may transmit the first cryptogram together with the first gacha event information to the first node.

The second gacha event information or the third gacha event information may include at least one of probability information of the gacha system, game information related to the gacha system, a gacha event type, a gacha event execution time, gacha event execution account information, information of a user terminal in which a gacha event is executed, an item acquired according to a gacha event execution result, and the amount of game goods used to execute a gacha event.

The processor may calculate an acquisition probability of each of items acquirable in the gacha system, based on the second gacha event information and the third gacha event information.

At least one of an account corresponding to a user terminal that has generated the first gacha event information and a user account corresponding to the first node may be provided with certain game goods.

The processor may update the acquired probability information of the gacha system based on additionally-acquired gacha event information and control the display to display the updated probability information of the gacha system.

Some embodiments of the present disclosure may provide a method of providing a gacha system service in a blockchain network, the method including: storing information determining a probability of a gacha system service to be provided through a decentralized application (DAPP), in a block constituting a blockchain; executing, through the DAPP, a gacha event by using a gacha system based on the stored information determining the probability of the gacha system service; and providing, through the DAPP, a result according to the execution of the gacha event.

Some embodiments of the present disclosure may provide a computer-readable recording medium storing a program for implementing the above method.

Mode of Disclosure

Hereinafter, example embodiments according to the present disclosure will be described in detail with reference to the accompanying drawings. Also, a method of configuring and using an electronic apparatus according to an embodiment of the present disclosure will be described in detail with reference to the accompanying drawings. In the drawings, like reference numerals or symbols may denote like parts or components that perform substantially the same function.

Although terms such as "first" and "second" may be used herein to describe various components, the components should not be limited by the terms. These terms are only used to distinguish one component from another component. For example, a first component may also be referred to as a second component, and vice versa. As used herein, the term "and/or" includes any and all combinations of one or more of the associated listed items.

The terms used herein are used to describe embodiments and are not intended to limit and/or restrict the present disclosure. As used herein, the singular forms "a", "an", and "the" are intended to include the plural forms as well, unless the context clearly indicates otherwise. It will be understood that terms such as "comprise," "include," and "have", when used herein, specify the presence of stated features, integers, steps, operations, elements, components, or combinations thereof, but do not preclude the presence or addition of one or more other features, integers, steps, operations, elements, components, or combinations thereof.

Throughout the specification, when an element is referred to as being "connected" to another element, it may be "directly connected" to the other element or may be "electrically connected" to the other element with one or more intervening elements therebetween. Also, when something is referred to as "including" a component, another component may be further included unless specified otherwise. Also, as used herein, the terms "units" and "modules" may refer to units that perform at least one function or operation, and the units may be implemented as hardware or software or a combination of hardware and software.

Hereinafter, game goods may refer to goods that may be acquired with or without cost by the user, as the currency that is used in the game. In other words, the game goods may refer to any types of goods used for transaction and purchase in the game, such as items and game counts in the game. The game goods may include paid goods and free goods. The game goods may include multiple types of goods. Also, the paid goods may include multiple types of goods, and the free goods may also include multiple types of goods.

Hereinafter, the paid goods may refer to game goods that are purchased by the user by paying an amount of money corresponding to a certain quantity of goods.

Hereinafter, the free goods may refer to game goods that are acquired by the user through the in-game or non-game activities of the user without paying an amount of money. The paid goods and the free goods may be the same type of goods or different types of goods.

Hereinafter, a gacha event may refer to the opportunity to draw at least one item among a plurality of items once or several times by using a gacha system.

Hereinafter, a gacha ticket may refer to the right to use the gacha event. In other words, the gacha ticket may refer to the right to use the gacha event provided through the gacha system, once or multiple times. Herein, for convenience of description, it is described as a gacha ticket; however, it is not limited to the type of a ticket and may include any types of items and objects having the right to use the gacha event. The gacha ticket may be purchased through goods, and the goods may include both paid goods and free goods in the game and may include real goods such as the user's cash. Also, herein, the gacha ticket may include any tickets that may use multiple classes of gacha.

Hereinafter, the probability of the gacha system may refer to the probability that at least one item among at least one acquirable item will be acquired or drawn according to execution of the gacha event. For example, the probability of the gacha system may refer to at least one probability among the probability that a first item will be acquired, the probability that a second item will be acquired, and the probability that a third item will be acquired, according to execution of the gacha event; however, the present disclosure is not limited thereto.

Hereinafter, gacha event information may refer to information about at least one gacha event. The gacha event information may be stored and provided in a separate format or may be included in a block constituting a blockchain; however, the present disclosure is not limited thereto.

Hereinafter, the items may include objects, products, content, and the like, and may refer to equipment such as weapons, armors, clothes, or crystals mounted by the in-game characters, boards boarded by the in-game characters, consumers such as foods or potions, any digital content such as experiences or buffs acquirable by the user in the game, or cyber targets; however, the present disclosure is not limited thereto.

Hereinafter, a quest may also be referred to as a request or a mission and may refer to a mission provided in the game. In other words, the quest may refer to an action for achieving a given goal in the game. For example, the user may acquire a quest "Explore Bat Cave" in the game. The difficulty levels of the respective quests may be different from each other, and the user's character may acquire experiences, goods, items, or the like according to the success of the quest or may lose some of the experiences, goods, or items possessed by the character according to the failure of the quest. That is, the value of the user's character may be changed according to the success or failure of the quest. A quest action may refer to an operation of performing the quest.

Hereinafter, the character may refer to a certain object that may be controlled by the user in the game. Character information may be information related to a game character and may include all information about the character, such as the level of the character, the class of the character, the cumulative use time of the character, the amount of money possessed by the character, the reputation of the character, the business achievement rate of the character, and the quest achievement rate of the character; however, the present disclosure is not limited thereto.

Hereinafter, a user account may refer to the account of the user including at least one character. In the game, the user may generate a plurality of characters, and a plurality of characters may depend on one user account. However, the present disclosure is not limited thereto, and there may be a mode of providing a game service through one user account. User account information may include the user's name, phone number, email address, game use period, or the like; however, the present disclosure is not limited thereto.

Hereinafter, cryptocurrency may refer to digital currency designed to function as an exchange means by using an encryption method. Also, the cryptocurrency may use an encryption method to secure transaction security, control generation of additional units, and authenticate transfer of assets.

Hereinafter, the blockchain may refer to a distributed peer-to-peer (P2P) system of a ledger using a software element including an algorithm in which blocks connected in order to secure and maintain integrity negotiate various information (e.g., transaction information and gacha event information) by using an encryption technique and security technology. Here, the distributed P2P system may be a special form of the distributed system. Also, in a P2P system, all nodes of a network may provide resources (e.g., processing power, storage space, and data or network bandwidth) to each other without coordination of a central node. Also, the "blockchain" may refer to a distributed ledger technology in which the ledger recording information is distributed in a P2P network rather than in a central server of a particular institution and is commonly recorded and managed by the nodes in the network.

Hereinafter, the node may refer to a component in a blockchain network. For example, the node may be a special-purpose computer, a general-purpose computer, a supercomputer, a mainframe computer, a personal computer (PC), a smartphone, or a tablet PC; however, the present disclosure is not limited thereto.

Hereinafter, an apparatus or an electronic apparatus may refer to an apparatus that operates by receiving electrical energy, and may be a concept including both a user terminal and a server. However, the present disclosure is not limited thereto.

Hereinafter, the user may refer to a user or a gamer; however, the present disclosure is not limited thereto.

FIG. 1 illustrates an online game providing system including a server and a user terminal according to some embodiments.

An online game providing system 100 of the present disclosure may include a server 170 and at least one user terminal 110 to 160. The server 170 may provide an online game system through a network. The server 170 may simultaneously provide an online game to at least one user terminal 110 to 160, and the online game may mean a game enjoyed by multiple users accessing the network.

According to some embodiments, the server 170 may include a single server, a group of servers, a cloud server, or the like; however, the present disclosure is not limited thereto. The server 170 may provide a game system, and the game system may include a database storing user and game data. Also, the server 170 may include a payment server that generates and processes a payment event.

According to some embodiments, the network may mean a connection established (or formed) by using all communication methods and may mean a communication network connected through all communication methods for transmitting and receiving data between a terminal and a terminal or between a terminal and a server.

All the communication methods may include all communication methods such as communication through a certain communication standard, a certain frequency band, a certain protocol, or a certain channel. For example, the communication methods may include Bluetooth, BLE, Wi-Fi, ZigBee, 3G, LTE, a communication method through ultrasound, or the like and may include short-range communication, long-range communication, wireless communication, and wired communication. However, the present disclosure is not limited thereto.

According to some embodiments, the short-range communication method may mean a communication method in which communication is possible only when a device (terminal or server) performing communication is within a certain range, and may include, for example, Bluetooth, NFC, or the like. The long-range communication method may mean a communication method in which a device performing communication may communicate regardless of the distance. For example, the long-range communication method may mean a method in which two devices performing communication through a repeater such as an AP may communicate even when spaced apart from each other by a certain distance or more, and may include a cellular network (3G or LTE) such as SMS and telephone. However, the present disclosure is not limited thereto. The meaning of receiving a game system by using a network may include the meaning that communication between a game server and a terminal may be performed through all communication methods.

Throughout the specification, at least one user terminal 110 to 160 may include not only a personal computer 110, a tablet 120, a cellular phone 130, a notebook 140, a smartphone 150, or a TV 160 but also various electronic devices such as personal digital assistants (PDAs), portable multimedia players (PMPs), navigations, MP3 players, digital cameras, refrigerators, washing machines, and cleaners; however, the present disclosure is not limited thereto.

According to some embodiments, the online game may include various genres such as sports, MMORPG, AOS, FPS, TCG, and CCG. Also, the online game may be a game of a user-to-user match method or may be a game of a user-to-computer (e.g., artificial intelligence) match method. Also, the online game may be a game of construction or decoration instead of match. However, the present disclosure is not limited thereto and there is no limit to the type of the online game.

According to some embodiments, the user terminals 110 to 160 may acquire gacha event information that is information about a gacha event occurring in at least one other user terminal. For example, a first user terminal may acquire second gacha event information that is information about a gacha event occurring in a second user terminal and third gacha event information that is information about a gacha event occurring in a third user terminal. Also, the user terminals 110 to 160 may acquire probability information of a gacha system based on gacha event information that is information about a gacha event occurring in another user terminal. For example, the first user terminal may acquire probability information of the gacha system based on the second gacha event information and the third gacha event information. This will be described below in more detail.

Figure 2:
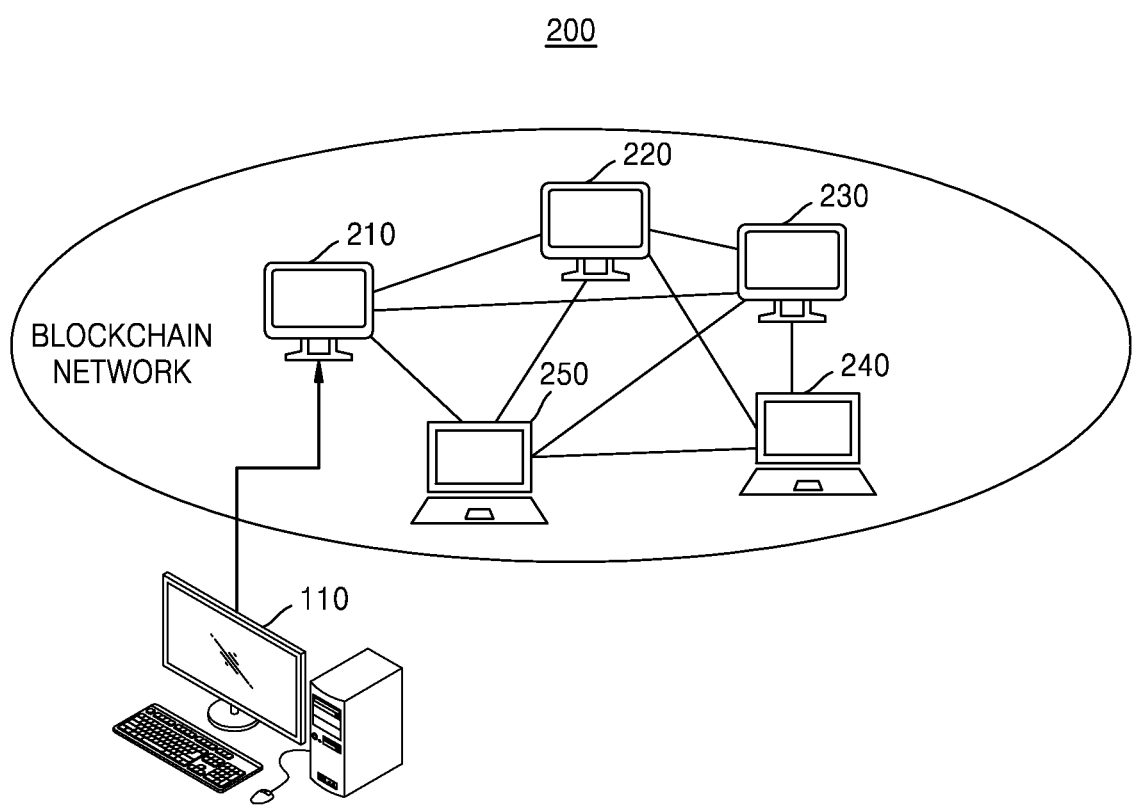
FIG. 2 is a diagram for describing the sharing of gacha system probability information in a blockchain network according to some embodiments.

FIG. 2 is a diagram for describing the sharing of gacha system probability information in a blockchain network according to some embodiments.

As described in FIG. 1, the online game providing system 100 of the present disclosure may include a server 170 and at least one user terminal 110 to 160. The server 170 may provide an online game system through a network.

However, as described above, the server 170 may provide a service for an online game, but may not provide all information related to the online game. In other words, at least one user terminal 110 to 160 may provide/receive information related to an online game to/from an external server or another user terminal.

Particularly, in order to share or provide high-security and reliable information related to the online game, information related to the online game may be transmitted/received by using the blockchain network of FIG. 2. A user terminal 110 illustrated in FIG. 2 may be a terminal provided with an online game service as described in FIG. 1. The user terminal 110 may receive information related to the online game from the server 170, but may also receive information related to the online game through the blockchain network.

For example, the user terminal 110 may acquire information about the gacha system through the blockchain network. Also, the user terminal 110 may acquire gacha event information of at least one other user terminal through the blockchain network and acquire probability information of the gacha system.

According to some embodiments, the user terminal 110 may transmit the gacha event information to a first node 210 among nodes 210, 220, 230, 240, and 250 on the blockchain network to record the gacha event information about the gacha event occurring in at least one user terminal. Also, the user terminal 110 may transmit the gacha event information to a second node 220 instead of the first node 210.

According to some embodiments, the nodes on the blockchain network may be at least one user terminal 110 to 160 of FIG. 1 or may be other terminals. In other words, the nodes on the blockchain network may be terminals that receive an online game service or may be terminals that do not receive an online game service.

Also, according to some embodiments, the first node 210 may verify the validity of the gacha event information and add the gacha event information to a candidate block when the gacha event information is valid. The first node 210 may perform operation verification on the candidate block and add the candidate block as a valid block to the blockchain. Also, the first node 210 or the user terminal 110 may be provided with a reward according to generation of the gacha event information. The reward may be provided as game goods; however, the present disclosure is not limited thereto. A method of sharing gacha probability information and acquiring gacha system probability information by using a blockchain network will be described below in more detail.

Also, according to some embodiments, not only gacha probability information may be shared but also a gacha system service or an online game service may be provided by using a blockchain network. For example, the blockchain network may store not only information for providing gacha probability information to at least one user terminal 110 to 160 of FIG. 1 but also data used to provide a gacha system or to provide an online game.

According to some embodiments, a gacha system service or an online game service may be provided through a decentralized application (DAPP). The DAPP may mean an application in which a separate server for providing a service does not exist. For example, the DAPP may be an application for using and developing a service provided by using a plurality of nodes included in a blockchain network without a central server such as a web server or a game server, and detailed descriptions thereof will be omitted because it is apparent to those of ordinary skill in the art. According to some embodiments, the DAPP may be a program code, in other words, a smart contract or a smart contract program code.

That is, the blockchain network may provide a gacha system service or an online game service to at least one user terminal 110 to 160 without the server 170 of FIG. 1 by using the DAPP for providing a gacha system or an online game.

According to some embodiments, the meaning that the blockchain network stores data may mean that at least one of the user terminals 110 to 160 or the nodes 210 to 250 on the blockchain network stores, records, or registers data to a block constituting the blockchain. The storing, recording, or registering of the data in the block constituting the blockchain may also be performed by using the DAPP.

Thus, at least one of the user terminals 110 to 160 or the nodes 210 to 250 on the blockchain network may store information determining the probability of the gacha system in the block constituting the blockchain, may execute a gacha event by using the gacha system based on the stored information determining the probability of the gacha system, and may provide a result according to the execution of the gacha event. The information determining the probability of the gacha system may also be referred to as a gacha engine because it is the information determining the probability, which is the most important information of the gacha system.

In other words, at least one of the user terminals 110 to 160 or the nodes 210 to 250 on the blockchain network may register, record, or store the gacha engine in the blockchain network to provide a gacha system service to at least one of the user terminals 110 to 160 or the nodes 210 to 250 on the blockchain network.

Also, according to some embodiments, at least one of an operation of storing, by at least one of the user terminals 110 to 160 or the nodes 210 to 250 on the blockchain network, the gacha engine in the blockchain network, an operation of executing the gacha event by using the gacha system, and an operation of providing the result according to the execution of the gacha event may be performed by using the DAPP.

Additionally, an online game service may also be provided in the same way as a method of providing a gacha system service. Thus, in the blockchain network, an online game service may be provided without the server of FIG. 1.

Figure 3:
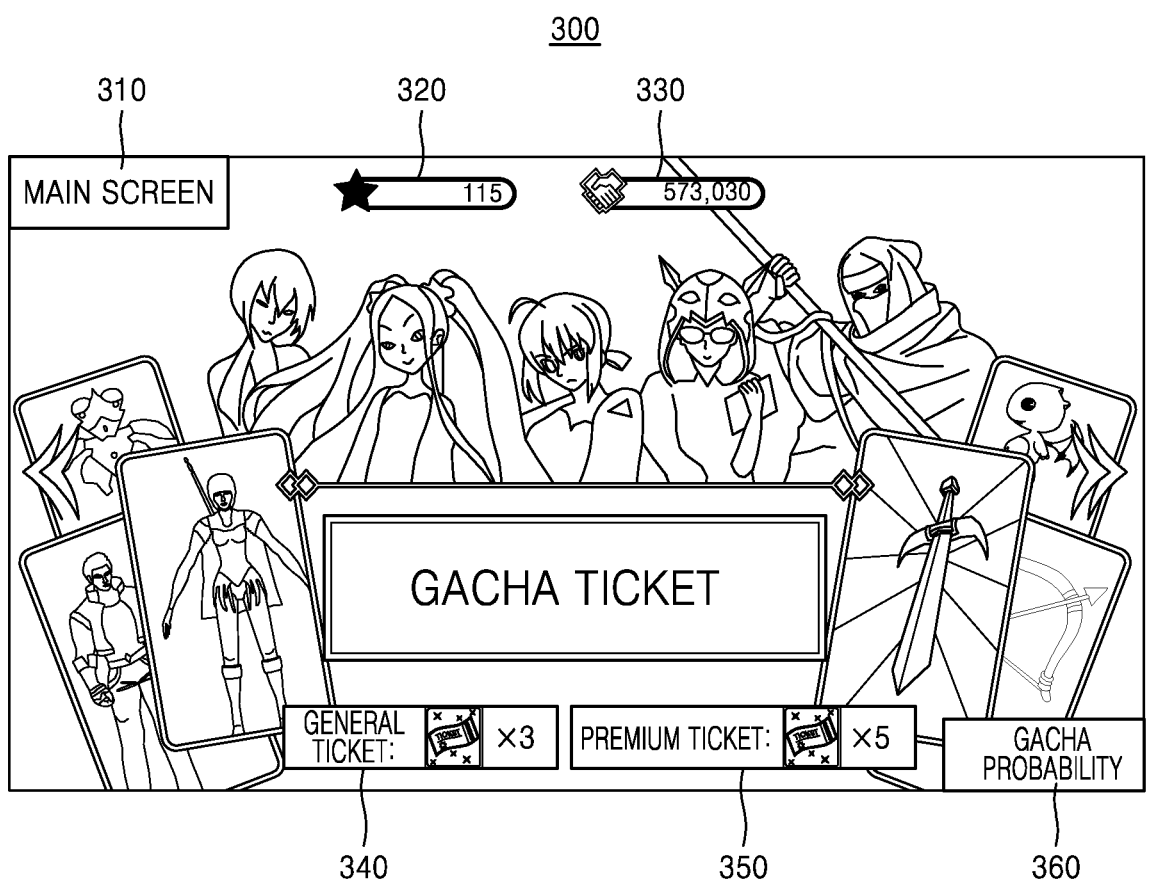
FIG. 3 is a diagram for describing a game screen and a gacha ticket according to some embodiments.

FIG. 3 is a diagram for describing a game screen and a gacha ticket according to some embodiments.

FIG. 3 illustrates a gacha system usage screen 300 displayed on a user terminal. The user terminal may use a gacha system by receiving a user input and requesting a server to execute a gacha event.

Referring to FIG. 3, various interfaces such as a main screen return interface 310, a first game goods quantity indication 320, a second game goods quantity indication 330, a general gacha use interface 340, a premium gacha use interface 350, and a gacha probability information check interface 360 may be displayed on the gacha system usage screen 300.

However, the gacha system usage screen 300 is not limited to the illustration of FIG. 3; for example, less information than the information illustrated in FIG. 3 may be displayed and more game information than the information illustrated in FIG. 3 may be displayed. Also, unlike the interface illustrated in FIG. 3, fewer or more interfaces may be displayed, and the interface and information that may be displayed on the user terminal are not limited to the example of FIG. 3.

Referring to the example of FIG. 3, the gacha event in FIG. 3 may include a general gacha event and a premium gacha event. According to some embodiments, the premium gacha event may be a gacha event having a high probability of a high-class item being drawn, and the general gacha event may be a gacha event having a lower probability of a high-class item being drawn than the premium gacha event. Also, there may be a separate item that may be drawn only in the premium gacha event, and the classes of gacha events may vary depending on the settings of a game service providing server.

Also, according to some embodiments, the gacha events may be classified according to the types of items that may be acquired through the gacha events. For example, the gacha events may be classified into a weapon gacha event, an armor gacha event, and an ornament gacha event. However, the present disclosure is not limited thereto, and the types and classes of gacha events may vary depending on the settings of the game service providing server.

According to some embodiments, the main screen return interface 310 may be an interface for converting the display on the user terminal to be converted from the gacha system usage screen 300 to the main screen according to the user's selection. Also, the user terminal may selectively transmit/receive data to/from the server for conversion from the gacha system usage screen 200 to the main screen.

According to some embodiments, the first game goods quantity indication 320 and the second game goods quantity indication 330 may be an interface for indicating the quantity of first game goods and the quantity of second game goods possessed by the user account. Additionally, the user terminal may perform a payment process by acquiring a user input for clicking the first game goods quantity indication 320 and the second game goods quantity indication 330.

According to some embodiments, the general gacha use interface 340 may be an interface for requesting execution of a general gacha event. The premium gacha use interface 350 may be an interface for requesting execution of a premium gacha event.

Also, although not illustrated in FIG. 3, an interface for executing a plurality of gacha events at once may be further included, and in the case of executing a plurality of gacha events at once, additional gacha event execution without consumption of game goods may be performed together. For example, the server may additionally provide one gacha event execution count when ten gacha events are executed; however, the present disclosure is not limited thereto.

Also, according to some embodiments, the gacha probability information check interface 360 may be an interface for converting the display on the user terminal to be converted to a screen on which the probability information of the gacha system is displayed. The probability information of the gacha system may be displayed on a pop-up screen or a new screen through the screen conversion; however, the present disclosure is not limited thereto. The probability information of the gacha system may be displayed on the user terminal in various forms, which will be described below in more detail. When necessary, the user terminal may transmit/receive data to/from at least one node of the blockchain network to display the probability information of the gacha system.

Also, according to some embodiments, the user terminal may acquire at least one item by requesting the execution of a gacha event. In other words, the server may receive a gacha event execution request from the user terminal and provide at least one item to the user account that has consumed the game goods corresponding to the gacha event. The user terminal that has acquired the information according to the execution result of the gacha event may generate gacha event information according to the execution result and share the generated gacha event information through the blockchain network. Also, the user terminal may receive probability information of the gacha system by receiving gacha event information about the gacha event occurring in at least one other user terminal.

Figure 4:
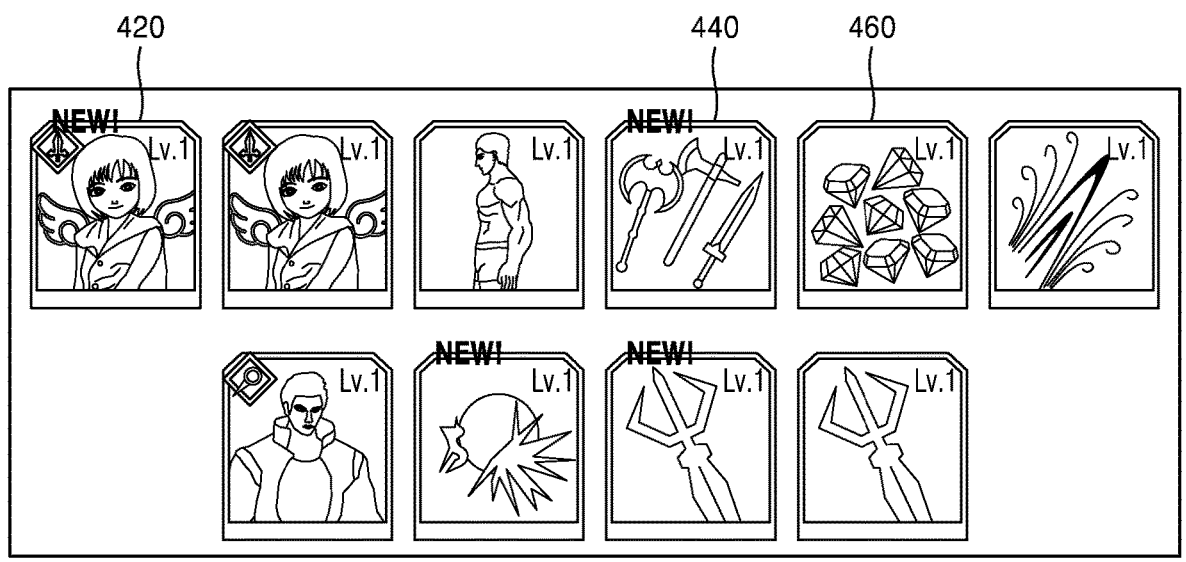
FIG. 4 is a diagram for describing the execution result of a gacha system according to some embodiments.

FIG. 4 is a diagram for describing the execution result of a gacha system according to some embodiments.

FIG. 4 illustrates a result screen 400 according to the execution of a gacha event by using the gacha system of FIG. 3. As described above, when the user terminal receives a user input for clicking a general gacha ticket use button or a premium gacha ticket use button, the game goods necessary for execution of the gacha event may be settled, charged, and paid and the gacha event may be executed.

According to some embodiments, at least one item acquired according to the execution of the gacha event may be illustrated on the result screen 400 according to the gacha event execution. Also, according to some embodiments, the number of items acquired according to the execution of the gacha event is not limited. Although 10 items are illustrated in FIG. 4, the number of items acquired per one gacha event may vary depending on the settings of the gacha system and the execution results of a plurality of gacha events may be displayed on one screen. However, the present disclosure is not limited thereto.

Also, according to some embodiments, the types of items acquired according to the execution of the gacha event are not limited. The item acquired according to the execution of the gacha event may be a character or equipment; however, the present disclosure is not limited thereto. The type of an item acquired according to the execution of the gacha event may correspond to the type of a gacha event (e.g., a weapon gacha event or an armor gacha event) set by the gacha system; however, the present disclosure is not limited thereto.

According to some embodiments, the user account may acquire the item displayed on the result screen 400 according to the gacha event execution. The result screen 400 according to the gacha event execution may display an identifier NEW for distinguishing items 420 and 440 not previously possessed by the user account from an item 460 previously possessed by the user account. However, the present disclosure is not limited thereto, and by comparison with the item previously possessed by the user account, information about whether the user account possesses the item may be displayed or may not be displayed on the result screen 400 according to the gacha event execution and also the display form thereof is not limited to the illustration in FIG. 4.

Figure 5:
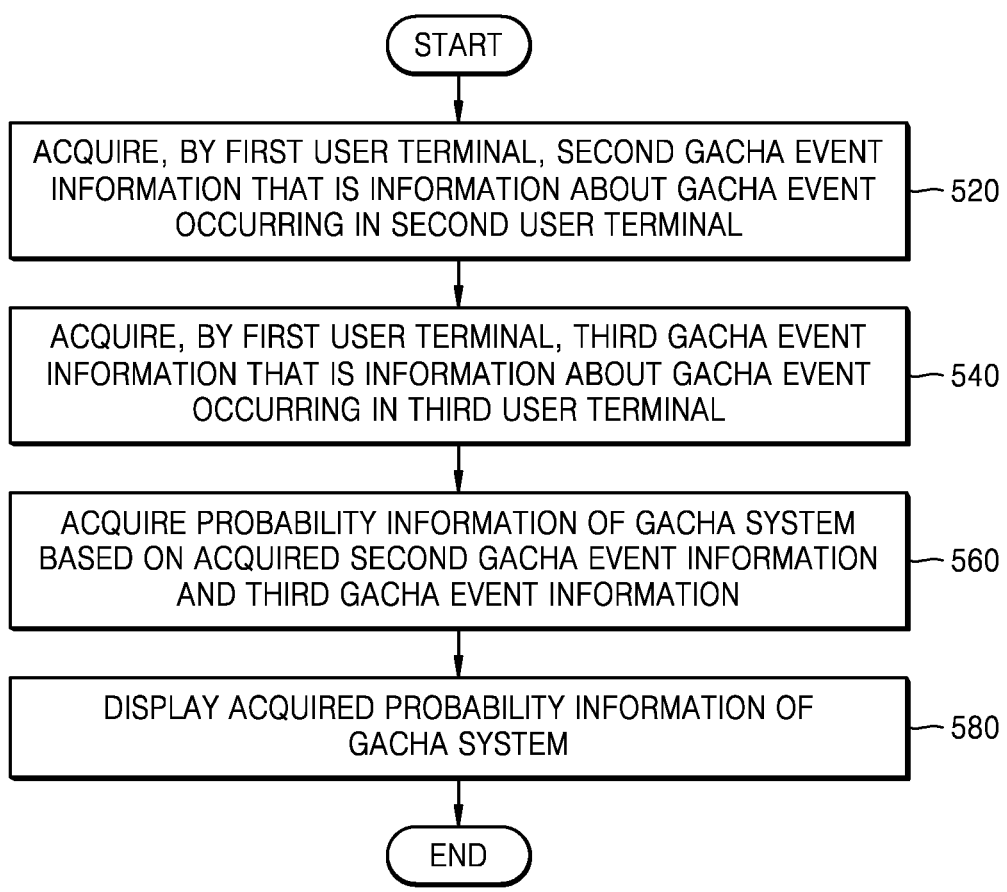
FIG. 5 is a diagram for describing a method of acquiring probability information of a gacha system according to some embodiments.

FIG. 5 is a diagram for describing a method of acquiring probability information of a gacha system according to some embodiments.

In operation 520, the first user terminal may acquire the second gacha event information that is information about the gacha event occurring in the second user terminal.

Herein, for convenience of description, the information about the gacha event occurring in the second user terminal will be described as the second gacha event information. In other words, the first user terminal may acquire information about the gacha event occurring in another user terminal.

According to some embodiments, the gacha event occurring in the other user terminal may mean that the other user terminal uses the gacha system and may mean that the other user terminal requests the server to execute the gacha event and acquires the execution result of the gacha event.

According to some embodiments, the second gacha event information may be provided by various methods. For example, the second gacha event information may be provided to the first user terminal through the game server, may be provided to the first user terminal through the external server instead of the game server, may be provided to the first user terminal from the second user terminal, and may be provided to the first user terminal through another user terminal other than the second user terminal.

According to some embodiments, the second gacha event information may be provided to the first user terminal through the blockchain network. According to some embodiments, the second gacha event information may be included in the block constituting the blockchain that distributes and manages the ledger recording the gacha event information. The first user terminal may acquire the second gacha event information by acquiring the block constituting the blockchain.

In operation 540, the first user terminal may acquire the third gacha event information that is information about the gacha event occurring in the third user terminal.

Herein, for convenience of description, the information about the gacha event occurring in the third user terminal will be described as the third gacha event information. In other words, the first user terminal may acquire information about the gacha event occurring in another user terminal, and as in operation 520 and operation 540, the first user terminal may acquire gacha event information that is information about the gacha event occurring in at least one user terminal or a plurality of other user terminals.

According to some embodiments, the third gacha event information may be provided by various methods. This may correspond to the acquisition of the second gacha event information described above, and thus redundant descriptions thereof will omitted for conciseness.

According to some embodiments, the third gacha event information may be provided to the first user terminal through the blockchain network. According to some embodiments, the third gacha event information may be included in the block constituting the blockchain that distributes and manages the ledger recording the gacha event information. The first user terminal may acquire the third gacha event information by acquiring the block constituting the blockchain. Also, the third gacha event information may be included in a block including the second gacha event information, or may be included in a block different from the block including the second gacha event information among the blocks constituting the blockchain.

According to some embodiments, the gacha event information may include at least one of the probability information of the gacha system, the game information related to the gacha system, the gacha event type, the gacha event execution time, the gacha event execution account information, the information of the user terminal in which the gacha event is executed, the item acquired according to the gacha event execution result, and the amount of game goods used to execute the gacha event.

According to some embodiments, the gacha event information may include probability information of the gacha system. For example, the probability information of the gacha system may include a probability depending on the class of an item to be acquired in a certain-class gacha event and may include an individual acquisition probability of each item, such as information that the probability of a 2-star item being acquired in a general gacha event is 40%, the probability of a 3-star item being acquired is 40%, the probability of a 4-star item being acquired is 15%, and the probability of a 5-star item being acquired is 5%.

Also, according to some embodiments, the probability information of the gacha system included in the second gacha event information and the probability information of the gacha system included in the third gacha event information may be equal to or different from each other. Because the probability information of the gacha system may be calculated by the accumulated gacha event execution result, it may be changed in real time; however, the present disclosure is not limited thereto.

Also, according to some embodiments, the game information related to the gacha system may be information indicating which game the gacha event information is about. According to some embodiments, the gacha event information may include information about a plurality of various games as well as information about a single game. Thus, information indicating whether the gacha event information is about the gacha system of Sudden Attack or the gacha system of Cheonae Myeongwoldo may be included.

Also, according to some embodiments, information about the type of the gacha event may be information indicating whether the gacha event information is information about a premium gacha event, information about a general gacha event, information about a weapon gacha event, or information about an accessory gacha event.

Also, according to some embodiments, the gacha event execution time may mean at least one of a gacha event execution request time or an item acquisition time according to a gacha event execution request. However, the present disclosure is not limited thereto, and it may mean information capable of specifying the time at which the gacha event was executed.

According to some embodiments, the account information on which the gacha event has been executed may include information about the user account on which the gacha event has been executed. The account information may include at least one of ID or identification information; however, the present disclosure is not limited thereto.

According to some embodiments, information of the user terminal on which the gacha event has been executed may include information about the user terminal corresponding to the user account on which the gacha event has been executed. The information about the user terminal may include at least one of a MAC address, an IP address, and information about the terminal type; however, the present disclosure is not limited thereto.

According to some embodiments, information about the item acquired according to the execution result of the gacha event may be information about the item acquired according to the execution result of the gacha event and may include, for example, at least one of the item's class, the item's name, and the item's identification number, and the item's detailed information (e.g., at least one of information such as an item image, an item description, an item attribute, an item ability, an item acquisition path, and an item acquisition quest); however, the present disclosure is not limited thereto.

According to some embodiments, the amount of game goods used to execute the gacha event may mean the amount of game goods consumed when the gacha event is executed. However, the present disclosure is not limited thereto.

Additionally, according to some embodiments, the gacha event information may include a gacha event execution count. The gacha event information may include all of the information about a plurality of gacha events and may include the gacha event execution count.

In operation 560, the first user terminal may acquire probability information of the gacha system based on the acquired second gacha event information and third gacha event information.

According to some embodiments, the first user terminal may calculate the acquisition probability of each of the items acquirable in the gacha system, based on the second gacha event information and the third gacha event information. Also, the first user terminal may calculate the acquisition probability for each class and each type of the items acquirable in the gacha system based on the probability information of the gacha system included in at least one of the second gacha event information and the third gacha event information.

In operation 580, the first user terminal may display the acquired probability information of the gacha system.

Also, according to some embodiments, the acquired probability information of the gacha system may be updated based on the additionally-acquired gacha event information, and the updated probability information of the gacha system may be displayed.

Also, according to some embodiments, the first user terminal may transmit the gacha event execution request, acquire the execution result of the gacha event, and generate first gacha event information based on the acquired execution result.

According to some embodiments, the first user terminal may generate the first gacha event information by requesting the record of the first gacha event information into at least one block constituting the blockchain to the first node on the blockchain network.

As described above, herein, for convenience of description, information about the gacha event occurring in the first user terminal is described as the first gacha event information, and according to some embodiments, the first gacha event information may mean information about the gacha event occurring in the first user terminal.

According to some embodiments, at least one of the account corresponding to the user terminal that has generated the first gacha event information and the user account corresponding to the first node may be provided with certain game goods. A method of generating and sharing the gacha event information through the blockchain network will be described below in more detail.

Figure 6:
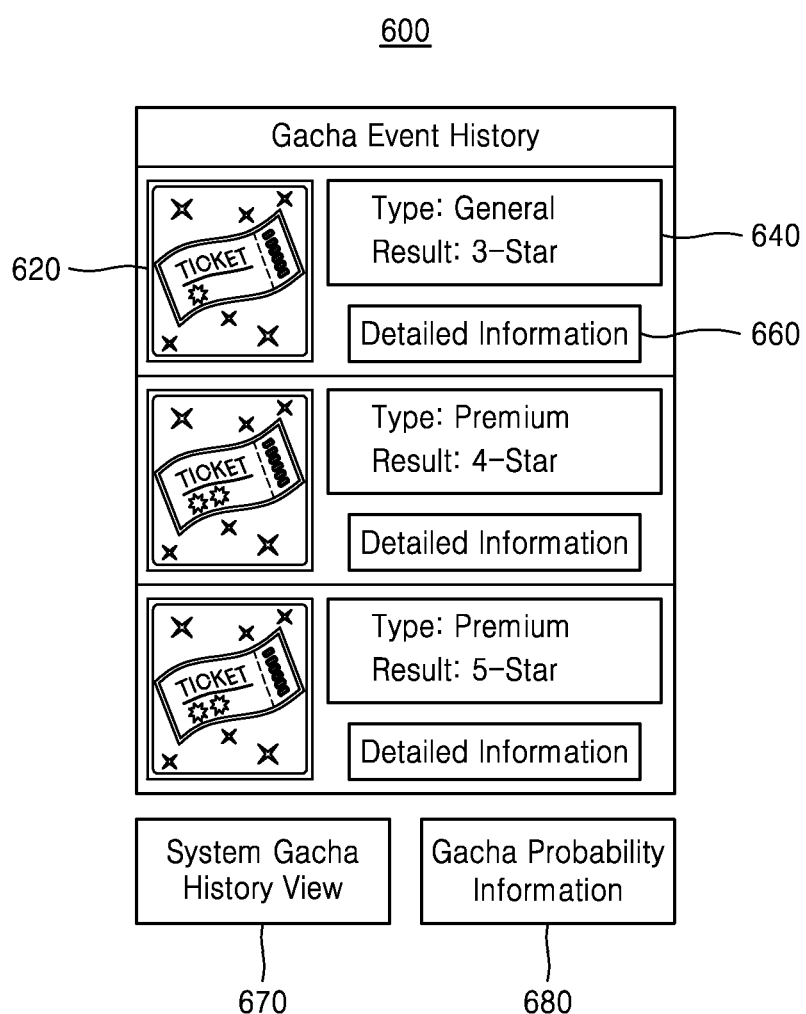
FIG. 6 is a diagram for describing gacha event information according to some embodiments.

FIG. 6 is a diagram for describing gacha event information according to some embodiments.

Referring to FIG. 6, the user terminal may display a gacha event information screen 600. The gacha event information screen 600 may include a gacha event indication 620, gacha event summary information 640, gacha event detailed information 660, a system gacha history view interface 670, and gacha probability information 680. However, the present disclosure is not limited thereto, and the gacha event information screen 600 may include more or less information and interfaces than the information and interfaces illustrated in FIG. 6.

According to some embodiments, the gacha event indication 620 may be an indication for distinguishing each gacha event. For example, the gacha event indication 620 may be an indication for distinguishing between the first gacha event and the second gacha event and may vary depending on the gacha event class and type. The gacha event indication 620 may include at least one of an icon, an image, and a text; however, the present disclosure is not limited thereto.

According to some embodiments, the gacha event summary information 640 may be an indication about some of the information about a certain gacha event. For example, the gacha event summary information 640 may include the execution result of the gacha event or information about the type of the gacha event; however, the present disclosure is not limited thereto.

According to some embodiments, the gacha event detailed information 660 may include all information about a certain gacha event. For example, the gacha event detailed information 660 may include the execution result of the gacha event, information about the type of the gacha event, the execution time of the gacha event, the execution account of the gacha event, or the consumption cost of the gacha event. The gacha event detailed information 660 may be displayed by conversion to a pop-up window or another screen. This will be described in more detail in FIG. 7.

According to some embodiments, the gacha event information screen 600 illustrated in FIG. 6 may include information about the gacha event occurring in the user terminal.

For example, the gacha event information screen 600 illustrated in FIG. 6 may be a screen on which the first user terminal displays the details of the gacha event occurring in the first user terminal.

According to some embodiments, the system gacha history view interface 670 may be a screen for displaying information about the gacha event performed in at least one other terminal. This will be described in more detail in FIG. 8. The system gacha history may be displayed through conversion to a pop-up window or another screen. This will be described in more detail in FIG. 7.

According to some embodiments, the gacha probability information 680 may include information about the probability of the gacha system. The gacha probability information 680 may include the probability information of the gacha system about a certain game, and may be displayed through conversion to a pop-up window or another screen. This will be described in more detail in FIGS. 8 and 9.

According to some embodiments, the gacha event information screen 600 may individually display information about each gacha event and may collectively display information about a plurality of gacha events. For example, the user terminal may display the result of the gacha event for each type of the gacha event as a premium gacha event and a general gacha event. Thus, the gacha event information screen 600 is not limited to the above example.

Figure 7:
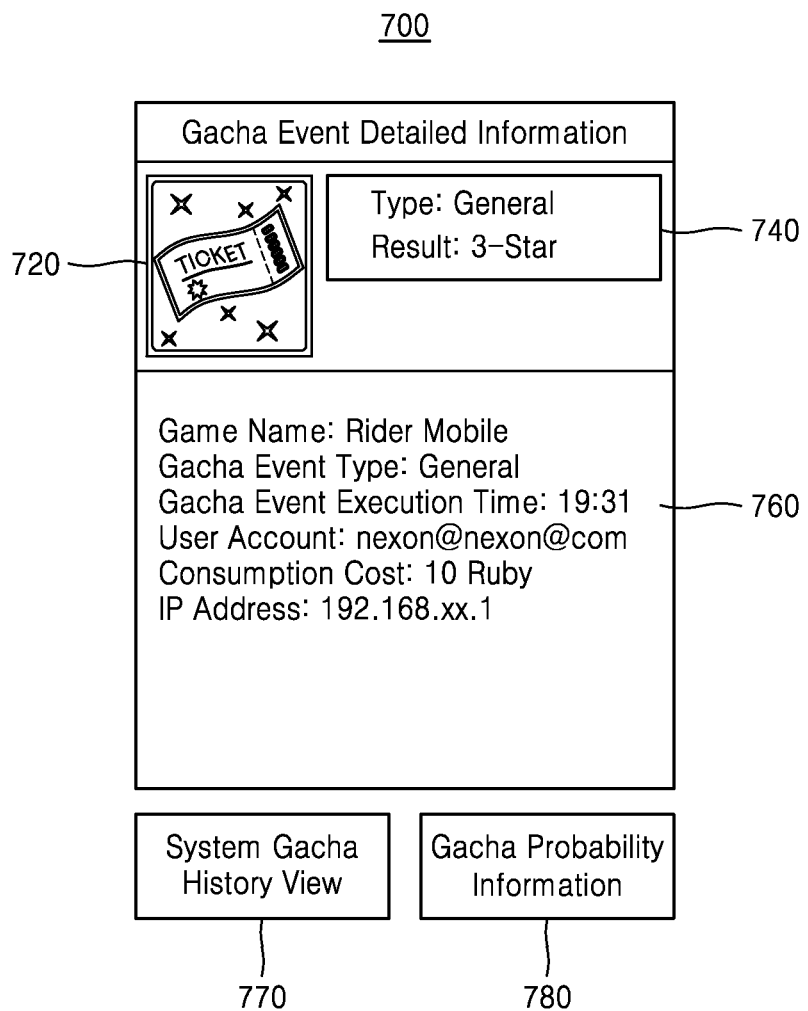
FIG. 7 is a diagram for describing gacha event detailed information according to some embodiments.

FIG. 7 is a diagram for describing gacha event detailed information according to some embodiments.

Referring to FIG. 7, the user terminal may display a gacha event detailed information screen 700. The gacha event detailed information screen 700 may include a gacha event indication 720, gacha event summary information 740, gacha event detailed information 760, a system gacha event view interface 770, and gacha probability information 780. However, the present disclosure is not limited thereto, and the gacha event detailed information screen 700 may include more or less information and interfaces than the information and interfaces illustrated in FIG. 7.

According to some embodiments, the gacha event indication 720 and the gacha event summary information 740 may correspond to those described above, and thus redundant descriptions thereof will be omitted for conciseness. Also, the gacha event indication 720 and the gacha event summary information 740 may not be included in the gacha event detailed information screen 700.

According to some embodiments, the gacha event detailed information 760 may include at least one of the execution result of the gacha event, information about the type of the gacha event, the execution time of the gacha event, the execution account of the gacha event, the consumption cost of the gacha event, or the IP address. However, the present disclosure is not limited thereto, and other information related to the gacha event may also be included.

According to some embodiments, the screen of FIG. 7 may be a screen popped up or converted based on a user input for clicking the gacha event detailed information 660 of FIG. 6. Additionally, the system gacha event view interface 770 and the gacha probability information 780 may correspond to those described above, and thus redundant descriptions thereof will be omitted for conciseness.

Figure 8:
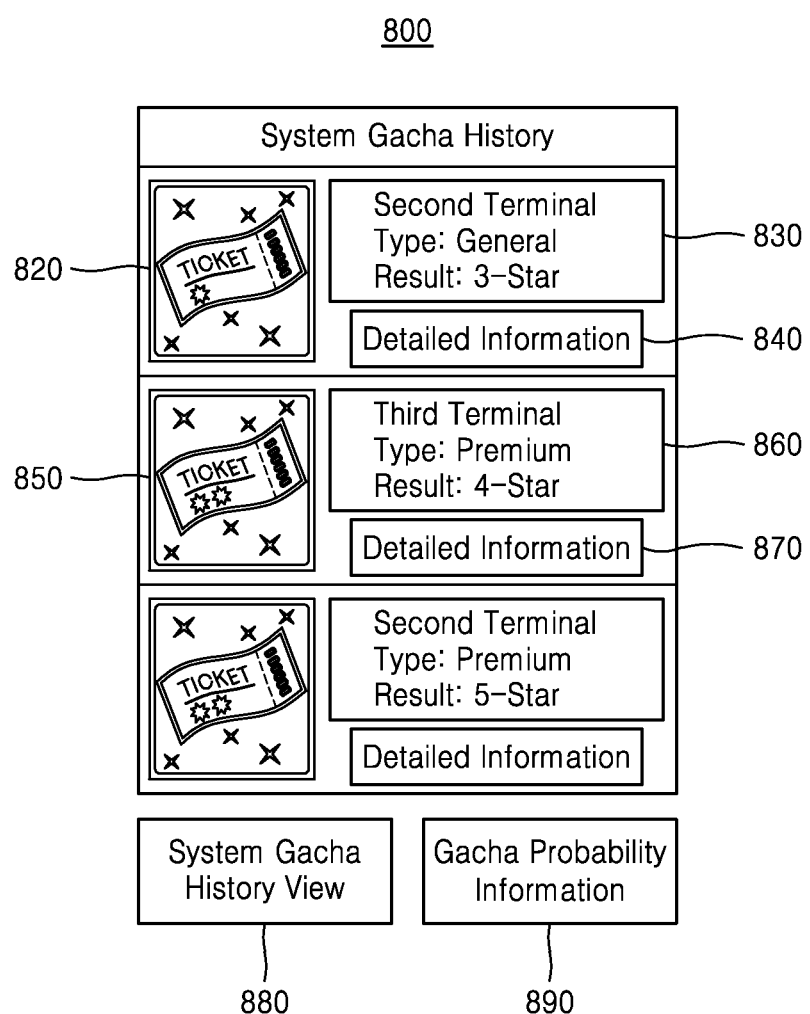
FIG. 8 is a diagram for describing gacha event information shared in a gacha system according to some embodiments.

FIG. 8 is a diagram for describing gacha event information shared in a gacha system according to some embodiments.

Referring to FIG. 8, the user terminal may display a system gacha event information screen 800. The system gacha event information screen 800 may include a first gacha event indication 820, first gacha event summary information 830, first gacha event detailed information 840, a second gacha event indication 850, second gacha event summary information 860, second gacha event detailed information 870, a terminal gacha history view interface 880, and gacha probability information 890. However, the present disclosure is not limited thereto, and the system gacha event information screen 800 may include more or less information and interfaces than the information and interfaces illustrated in FIG. 8.

According to some embodiments, the system gacha event information screen 800 of FIG. 8 may be a screen popped up or converted based on a user input for clicking the system gacha history view interface 670 on the gacha event information screen 600 of FIG. 6 or a user input for clicking the system gacha event view interface 770 on the gacha event detailed information screen 700 of FIG. 7.

According to some embodiments, the system gacha event information screen 800 illustrated in FIG. 8 may include information about the gacha event occurring in another user terminal other than the user terminal. For example, the system gacha event information screen 800 illustrated in FIG. 8 may include information about the gacha event occurring in the second user terminal and information about the gacha event occurring in the third user terminal. In other words, the first user terminal may acquire and display information about the second user terminal and the gacha event occurring in the second user terminal.

According to some embodiments, the first gacha event indication 820 may be an indication representing the first gacha event, the first gacha event summary information 830 may include summary information about the first gacha event, and the first gacha event detailed information 840 may include detailed information about the first gacha event. This may correspond to the above description, and thus redundant descriptions thereof will be omitted for conciseness. Also, according to some embodiments, the first gacha event of FIG. 8 may mean the gacha event occurring in the second user terminal.

According to some embodiments, the second gacha event indication 850, the second gacha event summary information 860, and the second gacha event detailed information 870 may correspond to those described above, and thus redundant descriptions thereof will be omitted for conciseness. The second gacha event of FIG. 8 may mean the gacha event occurring in the third user terminal.

According to some embodiments, the terminal gacha history view interface 880 may display information about the gacha event occurring in the terminal. For example, the terminal gacha history view interface 880 may be an interface by which the first user terminal calls a screen for displaying information about the gacha event occurring in the first user terminal.

According to some embodiments, an embodiment of separately displaying gacha events in the user terminal and another user terminal is described in FIGS. 6 to 8; however, the present disclosure is not limited to the example of FIGS. 6 to 8. In other words, all gacha events performed through the gacha system may be displayed at once regardless of the user terminals. Also, according to some embodiments, each user terminal may be classified to display the gacha event performed in each user terminal; however, the present disclosure is not limited thereto. That is, there may be no limit to a method of displaying the gacha event information that is information about at least one gacha event.

Also, according to some embodiments, the gacha probability information 890 may correspond to that described above, which will be described below in detail with reference to FIGS. 9 and 10.

Figure 9:
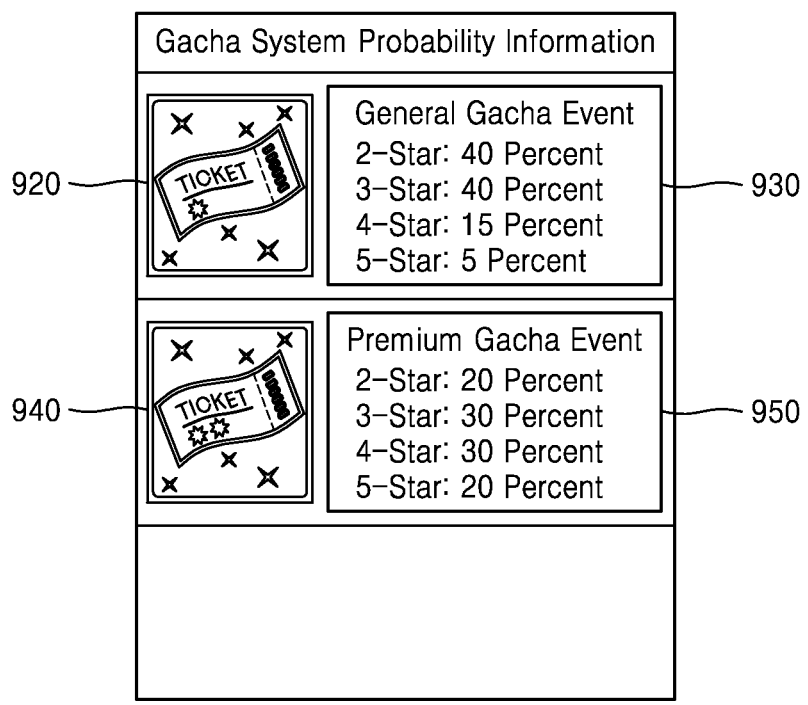
FIGS. 9 and 10 are diagrams for describing probability information of a gacha system based on gacha event information according to some embodiments.
Figure 10:
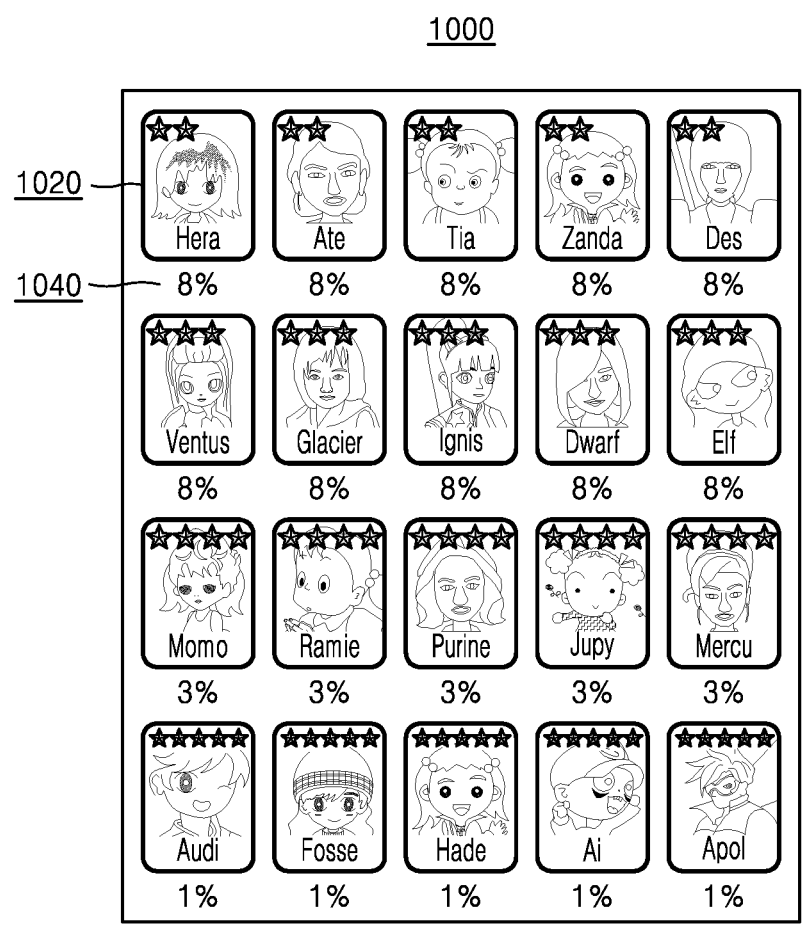

FIGS. 9 and 10 are diagrams for describing probability information of a gacha system based on gacha event information according to some embodiments.

Referring to FIG. 9, the user terminal may display a gacha system probability information screen 900. The gacha system probability information screen 900 may include a general gacha event indication 920, general gacha event probability information 930, a premium gacha event indication 940, and premium gacha event probability information 950. However, the present disclosure is not limited thereto, and the gacha system probability information screen 900 may include more or less information and interfaces than the information and interfaces illustrated in FIG. 9.

The probability information of the gacha system of FIG. 9 may be information displayed according to the types of gacha events. For example, the types of gacha events may be classified through the general gacha event indication 920 and the premium gacha event indication 940, the class-by-class probability of the item acquirable when the general gacha event is executed may be displayed through the general gacha event probability information 930, and the class-by-class probability of the item acquirable when the premium gacha event is executed may be displayed through the premium gacha event probability information 950.

Referring to FIG. 9, the general gacha event probability information 930 indicates that a 2-star item is acquired by 40%, a 3-star item is acquired by 40%, a 4-star item is acquired by 15%, and a 5-star item is acquired by 5%. The terms 2-star, 3-star, 4-star, and 5-star may be in-game terms representing the classes of items. Also, the premium gacha event probability information 950 indicates that a 2-star item is acquired by 20%, a 3-star item is acquired by 30%, a 4-star item is acquired by 30%, and a 5-star item is acquired by 20%. Although FIG. 9 illustrates that the item acquisition probability according to the execution of the gacha event is displayed by class, the acquisition probability of each item may be separately displayed.

Referring to FIG. 10, the user terminal may display an item-by-item probability information screen 1000 of the gacha system. The item-by-item probability information screen 1000 of the gacha system may include an item indication 1020 and an item acquisition probability 1040. However, the present disclosure is not limited thereto, and the item-by-item probability information screen 1000 of the gacha system may include more or less information and interfaces than the information and interfaces illustrated in FIG. 10.

According to some embodiments, the probability information of the gacha system may be calculated and displayed in various ways. The class-by-class probability information of the gacha system may be displayed as illustrated in FIG. 9, and the item-by-item probability information may be displayed as illustrated in FIG. 10.

Referring to FIG. 10, the probability of acquiring each of 2-star items may be 8% and thus the total probability of acquiring the 2-star items may be 40%; the probability of acquiring each of 3-star items may be 8% and thus the total probability of acquiring the 3-star items may be 40%; the probability of acquiring each of 4-star items may be 3% and thus the total probability of acquiring the 4-star items may be 15%; the probability of acquiring each of 5-star items may be 1% and thus the total probability of acquiring the 5-star items may be 5%. However, the present disclosure is not limited to the example of FIG. 10, and the probabilities of acquiring the items of the same class may be different from each other.

Figure 11:
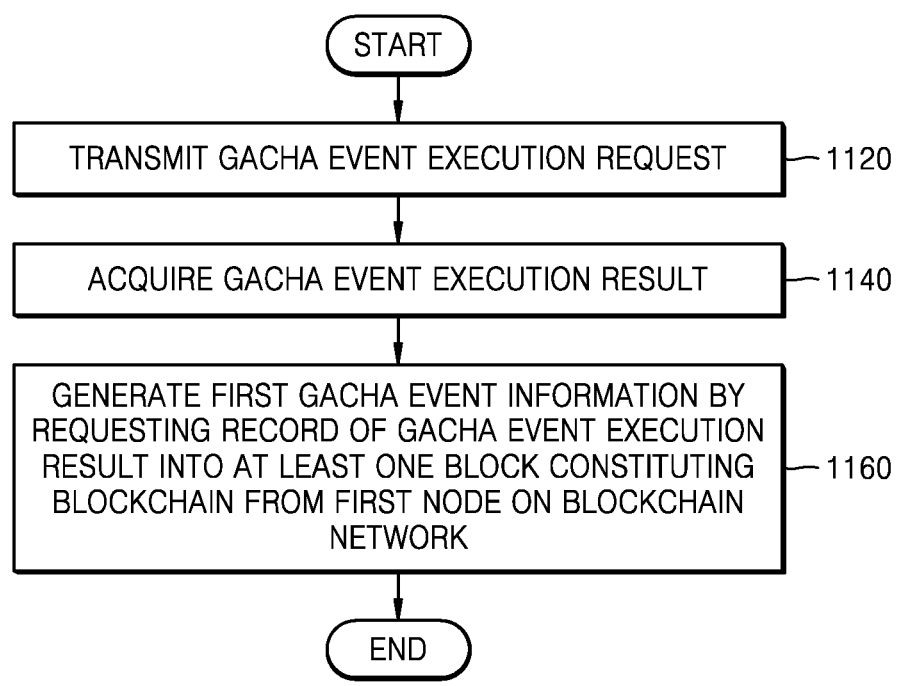
FIG. 11 is a flowchart for describing a method of generating gacha event information by using a blockchain according to some embodiments.

FIG. 11 is a flowchart for describing a method of generating gacha event information by using a blockchain according to some embodiments.

In operation 1120, the user terminal may transmit a gacha event execution request. According to some embodiments, the user terminal may transmit the gacha event execution request to the game server based on a user input.

In operation 1140, the user terminal may acquire a gacha event execution result.

According to some embodiments, when necessary, the user terminal may perform separate payment processes collectively or independently, and the cost for executing the gacha event may be paid by using the game goods or cryptocurrency possessed by the user account corresponding to the user terminal.

According to some embodiments, the user terminal may execute a separate electronic wallet for using the cryptocurrency, may perform a payment process, may display the amount of cryptocurrency in the game, and may pay the cost for execution of the gacha event by using the cryptocurrency based on a user input for approving the use thereof.

In operation 1160, the user terminal may generate the first gacha event information by requesting the record of the gacha event information into at least one block constituting the blockchain to the first node on the blockchain network.

According to some embodiments, the first user terminal may encrypt the first gacha event information and transmit the encrypted first gacha event information to the first node.

Also, the first user terminal may generate a first hash value corresponding to the first gacha event information by applying the first gacha event information to a hash function for generating unique data about the first gacha event information, and may generate a first cryptogram representing a digital signature of the first gacha event information by encrypting the first hash value with a private key of the user that has executed the gacha event. The first user terminal may transmit the first cryptogram to the first node together with the first gacha event information.

Although FIG. 11 illustrates that the first user terminal and the first node are separate apparatuses, the first user terminal may be the first node. In other words, the first user terminal may be the same device as the first node or a different device therefrom.

Figure 12:
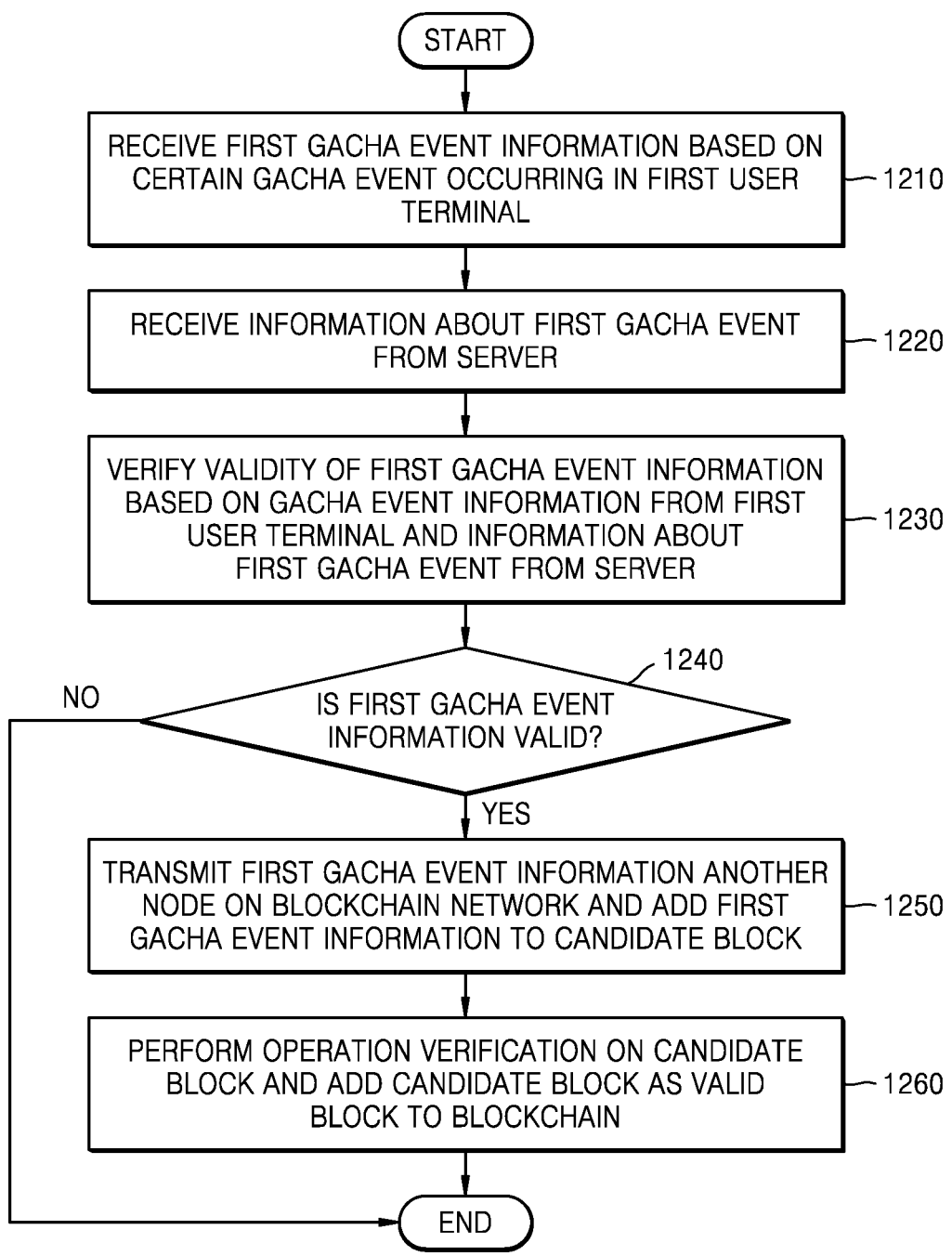
FIG. 12 is a flowchart for describing an operation of a node on a blockchain network that distributes and manages a ledger recording gacha event information according to some embodiments.

FIG. 12 is a flowchart for describing an operation of a node on a blockchain network that distributes and manages a ledger recording gacha event information according to some embodiments.

In operation 1210, the first node on the blockchain network that distributes and manages the ledger recording the gacha event information may receive the first gacha event information from the first user terminal. According to some embodiments, the first gacha event information may be information generated based on the gacha event occurring in the first user terminal, and the first gacha event may be an event occurring between the game server and the user terminal.

In operation 1220, the first node may receive the first gacha event information from the server.

In operation 1230, the first node may verify the validity of the first gacha event information based on the first gacha event information from the first user terminal and the first gacha event information from the server. However, the validity verification of operation 1230 may be omitted depending on the implementation.

In operation 1240, when it is determined that the first gacha event information is valid, the first node may perform an operation according to operation 1250. On the other hand, when it is determined that the first gacha event information is invalid, the first node may discard the first gacha event information.

In operation 1250, the first node may transmit the first gacha event information to the second node on the blockchain network. Also, the first node may add the first gacha event information to a candidate block of the block that may be connected to the blockchain.

In operation 1260, the first node may perform operation verification on the candidate block and add the candidate block as a valid block to the blockchain.

Figure 13:
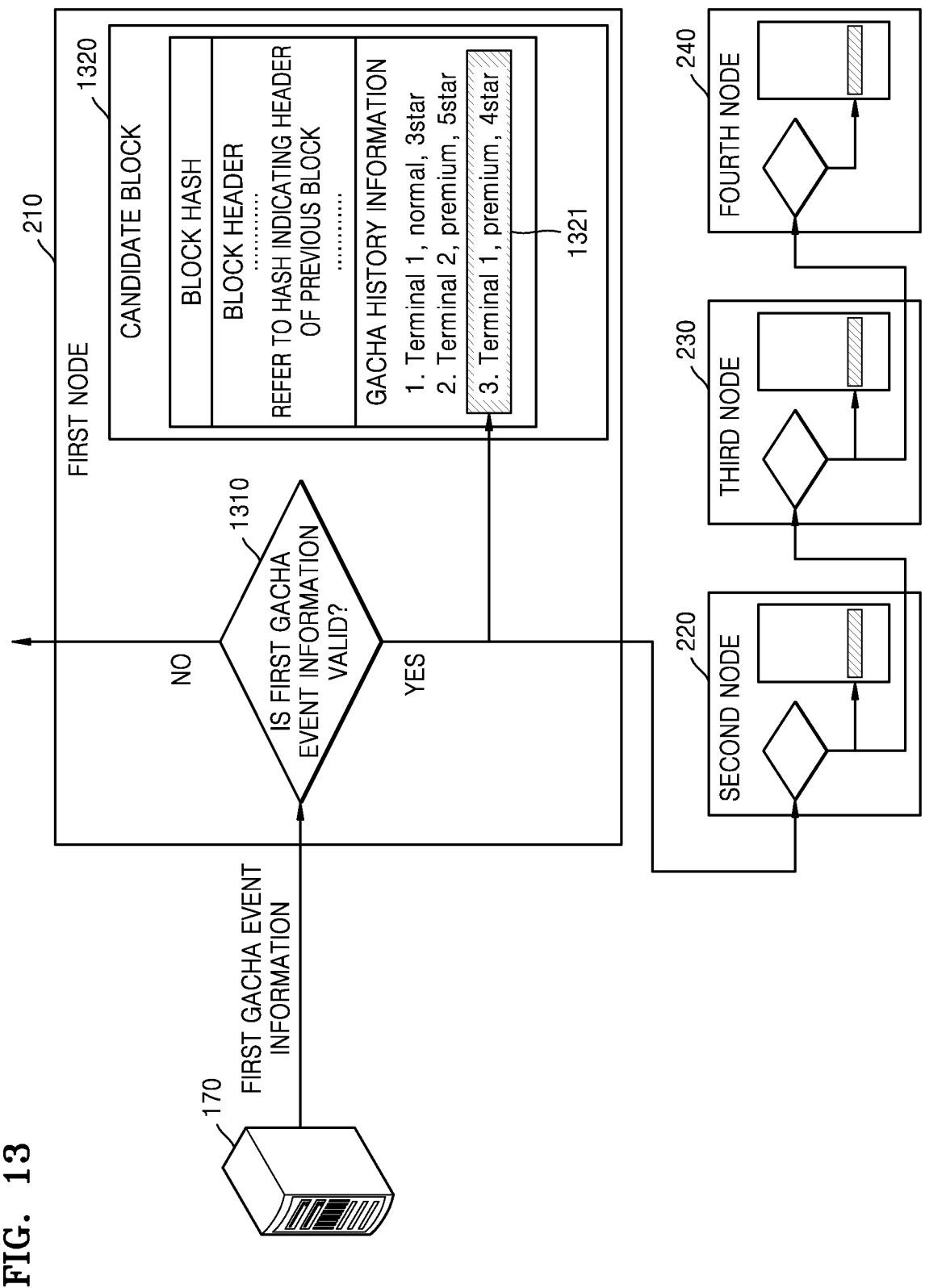
FIG. 13 is a diagram for describing a process of propagating valid gacha event information to nodes on a blockchain network and recording the same in a blockchain according to some embodiments.

FIG. 13 is a diagram for describing a process of propagating valid gacha event information to nodes on a blockchain network and recording the same in a blockchain according to some embodiments.

Referring to FIG. 13, the first user terminal 110 may request the server 170 to execute the gacha event. Also, the first user terminal 110 may acquire the gacha event execution result. The first user terminal 110 may encrypt the first gacha event information that is information about the gacha event occurring in the first user terminal 110, and may transmit the encrypted first gacha event information to the first node 210 on the blockchain network. An operation of encrypting, by the first user terminal 110, the first gacha event information and transmitting the same to the first node 210 will be described below in more detail with reference to FIG. 14.

According to some embodiments, the first node 210 may decrypt the encrypted first gacha event information and verify whether the first gacha event information is valid based on the decryption result (1310). An operation of verifying, by the first node 210, the validity of the first gacha event information will be described below in detail with reference to FIG. 15.

According to some embodiments, as a result of verifying the validity of the first gacha event information, when it is determined that the first gacha event information is invalid, the first node 210 may discard the first gacha event information.

According to some embodiments, as a result of verifying the validity of the first gacha event information, when it is determined that the first gacha event information is valid, the first node 210 may transmit the first gacha event information to the second node 220 on the blockchain network. Also, the first node 210 may record, in a candidate block 1320, first gacha event information 1321 (Terminal 1, Premium, 4-star) representing information indicating that the first user terminal 110 has acquired a 4-star item in a premium gacha event (Terminal 1, Premium, 4-star). When certain gacha event information is recorded in the candidate block 1320, the first node 210 may generate a valid block by performing operation verification on the candidate block 1320.

Also, according to some embodiments, when the validity of the first gacha event information is also verified in the second node 220, the second node 220 may add the first gacha event information to the candidate block 1320 and generate a valid block by performing operation verification on the candidate block 1320. The operations of the third node 230 and the fourth node 240 may also correspond to the operations of the first node or the second node 220, and thus redundant descriptions thereof will be omitted for conciseness.

According to some embodiments, in the process of generating a valid block in the first node 210 and adding the same to the blockchain, the first node 210 may calculate the root of a Merkle tree about certain gacha event information. The first node 210 may generate a hash reference indicating a previous block header from the viewpoint of a block to be added to the blockchain. The first node 210 may acquire a difficulty level required in the restriction or the operation verification of the block to be added to the blockchain. The first node 210 may determine whether the value of a block hash generated by applying a hash function to the root of the Merkle tree, the hash reference indicating the previous block header, the difficulty level, the data of a timestamp, and the nonce satisfies the restriction. The first node 210 may increase the nonce from 0 to 1, acquire the value of the nonce satisfying the restriction, and perform operation verification on the candidate block 1320. The first node 210 may add the candidate block 1320 as a valid block to the blockchain. Also, the first node 210 may transmit the valid block to other nodes 220 to 250 on the blockchain network.

According to some embodiments, other nodes 220 to 250 on the blockchain network may perform verification on the valid block received from the first node 210, and add the valid block to the blockchain possessed by the respective nodes 220, 230, 240, and 250.

Figure 14:
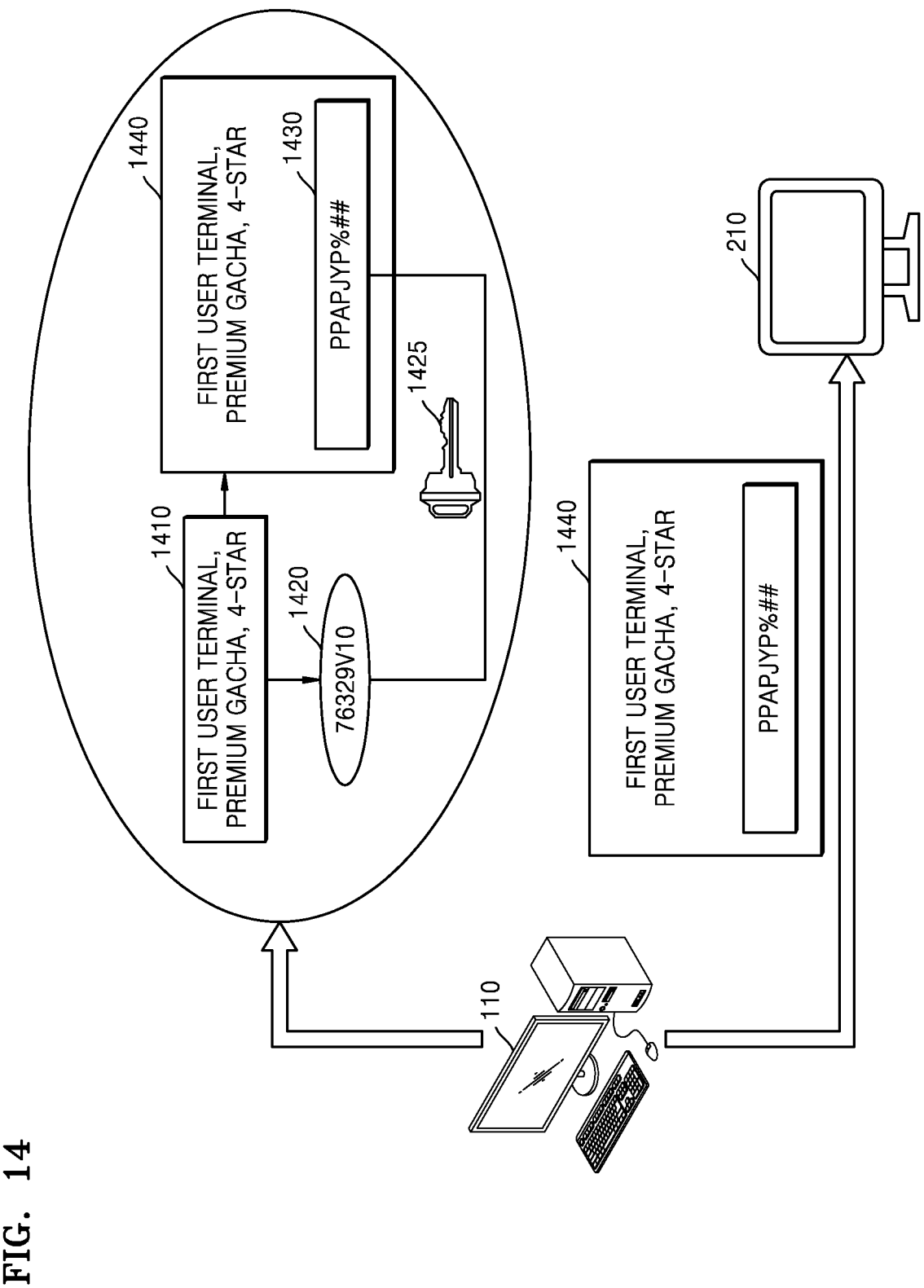
FIG. 14 is a diagram for describing a process of transmitting digitally-signed gacha event information from a user terminal to a node on a blockchain network according to some embodiments.

FIG. 14 is a diagram for describing a process of transmitting digitally-signed gacha event information from a user terminal to a node on a blockchain network according to some embodiments.

Referring to FIG. 14, the first user terminal 110 may encrypt first gacha event information 1410 (First user terminal, Premium gacha, 4-star) that is information corresponding to a 4-star item acquired by the first user terminal through the premium gacha event execution with the server, and transmit encrypted gacha event information 1440 to the first node 210 on the blockchain network.

Also, according to some embodiments, the first user terminal 110 may generate a hash value (76329V10) 1420 corresponding to the first gacha event information 1410 by applying the first gacha event information 1410, which is information corresponding to a 4-star item acquired by the first user terminal through the premium gacha event execution with the server, to a hash function for generating unique data about the gacha event information.

The first user terminal 110 may encrypt the hash value (76329V10) 1420 with a private key 1425 of the first user and generate a first cryptogram (PPAPJYP%##) 1430 representing a digital signature of the first gacha event information 1410. The first user terminal 110 may transmit, to the first node 210, the encrypted gacha event information 1440 obtained by combining the first cryptogram (PPAPJYP%##) 1430 with the first gacha event information 1410.

Figure 15:
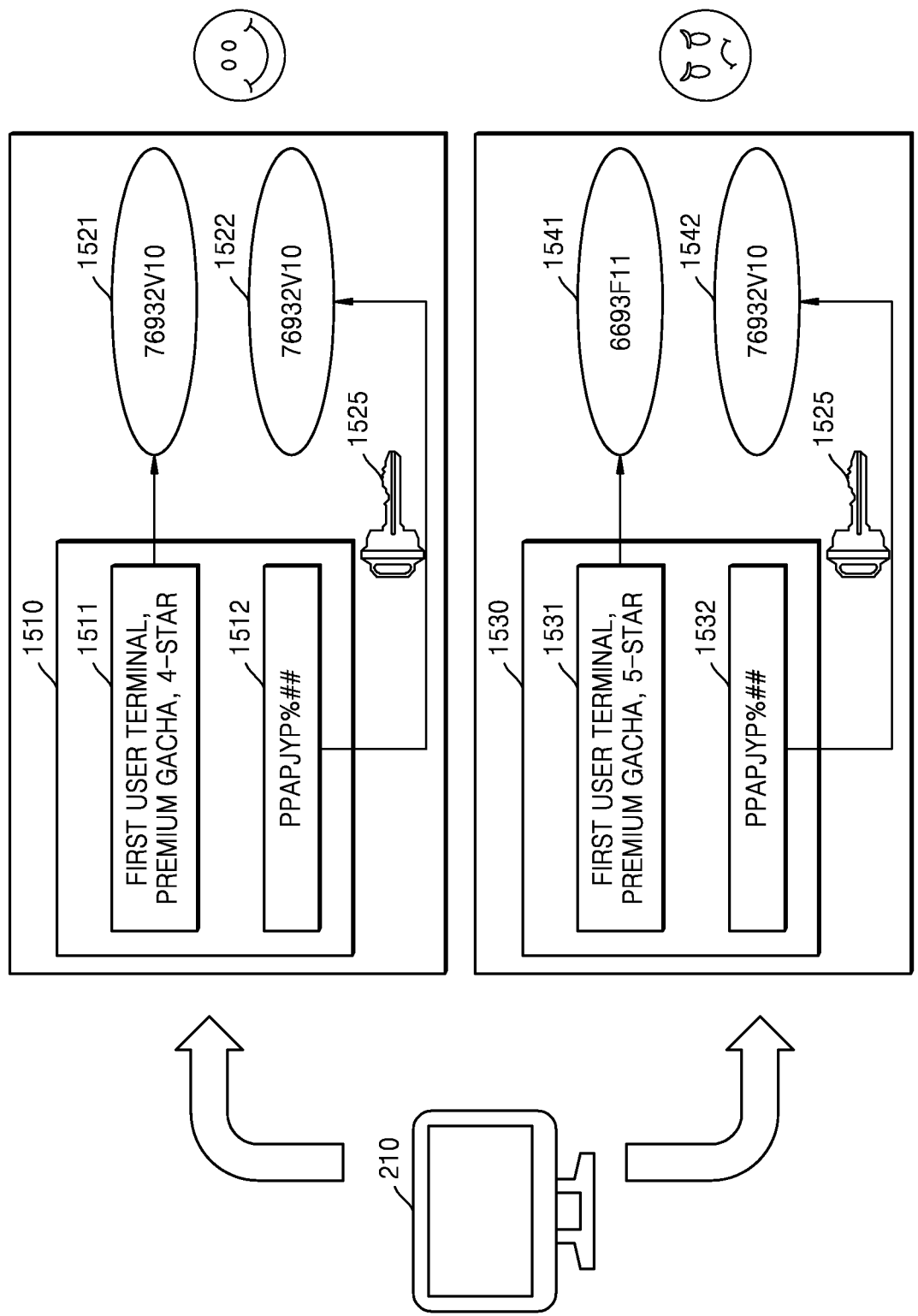
FIG. 15 is a diagram for describing a process of verifying the validity of gacha event information in a node on a blockchain network according to some embodiments.

FIG. 15 is a diagram for describing a process of verifying the validity of gacha event information in a node on a blockchain network according to some embodiments.

According to some embodiments, the first node 210 may receive first gacha event information 1510 from the first user terminal 110. The first gacha event information 1510 may include a first cryptogram (PPAPJYP%##) 1512 and first gacha result information 1511 that is information (First user terminal, Premium gacha, 4-star) corresponding to a 4-star item acquired by the first user terminal through the premium gacha event execution with the server.

According to some embodiments, the first node 210 may generate a first hash value (76932V10) 1521 corresponding to the gacha result information 1511 by applying a hash function to the received first gacha result information 1511. The first node 210 may generate a second hash value (76932V10) 1522 by decrypting the first cryptogram (PPAPJYP%##) 1512 by using a public key 1525 of the first user. Because the first hash value 1521 and the second hash value 1522 are the same as 76932V10, the first node 210 may determine that the gacha event information 1510 received from the first user terminal is valid.

However, as another example, the first node 210 may receive second gacha event information 1530 from the first user terminal 110. The second gacha event information 1530 may include a second cryptogram (PPAPJYP%##) 1532 and second gacha result information 1531 that is information (First user terminal, Premium gacha, 5-star) corresponding to a 5-star item acquired by the first user terminal through the premium gacha event execution with the server.

According to some embodiments, the first node 210 may generate a third hash value (6693F11) 1541 corresponding to the second gacha result information 1531 by applying a hash function to the second gacha result information 1531. The first node 210 may generate a fourth hash value (76932V10) 1522 by decrypting the first cryptogram (PPAPJYP%##) 1512 by using the public key 1525 of the first user. Because the third hash value 1541 and the fourth hash value 1542 are different from each other, the first node 210 may determine that the second gacha event information 1530 received from the first user terminal is invalid.

Figure 16:
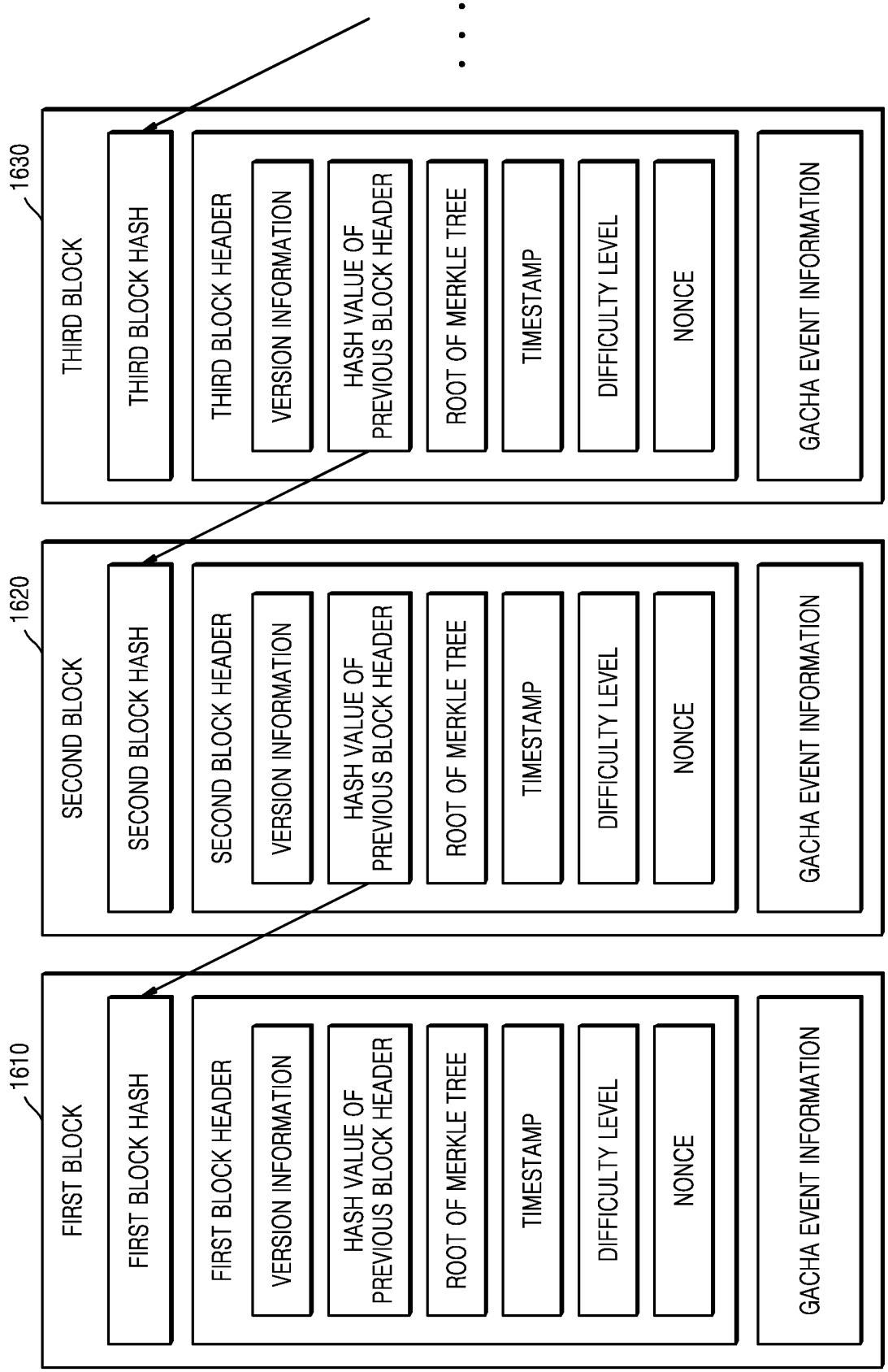
FIG. 16 is a block diagram for describing the structure of a block and a blockchain according to some embodiments.

FIG. 16 is a block diagram for describing the structure of a block and a blockchain according to some embodiments.

As illustrated in FIG. 16, a blockchain may be constructed by connecting blocks recording valid information. That is, the data structure of the blockchain may be a certain data structure including units in which blocks recording information are arranged in order. Also, the data structure of the blockchain may include a data structure in which each block header is connected in a chain form with reference to the previous block header, a hash reference indicating data, and a data structure of a Merkle tree in which data is connected in a tree form. Also, there may be no limit to the type and kind of information that may be included in a block. For example, the transaction information may be included in the blockchain and the gacha event information may be included therein; however, the present disclosure is not limited thereto.

According to some embodiments, the block may include a block hash, a block header, gacha event information, or the like. The block header may include a version of the current program, a hash value of the previous block header, a root of the Merkle tree, a timestamp, a difficulty level, and information of the nonce.

According to some embodiments, the block hash may be a hash value of the hash function applied by using a version of the current program, a hash value of the previous block header, a root of the Merkle tree, a timestamp, a difficulty level, and information of the nonce as input values. That is, the value of the block hash may be a value obtained by hashing the block header, not a value obtained by hashing the entire block.

According to some embodiments, the hash value of the previous block header may be used to uniquely identify each block header and refer to the previous block header. When each block header refers to the previous block header, the order of individual block headers and blocks may be maintained. Referring to FIG. 16, because a first block 1610 is the first block and thus there is no previous block thereof, there may be no reference indicating the previous block header. Thus, the hash value of the previous block header of the first block 1610 may be 0. Also, because a second block 1620 has the first block 1610 that is the previous block thereof, the second block header may have a hash value indicating the first block header. Likewise, because a third block 1630 has the second block 1620 that is the previous block thereof, the third block header may have a hash value indicating the second block header.

According to some embodiments, the Merkle tree may mean a structure in which data of the gacha event information and the hash reference are connected in a tree form. The hash reference may indicate data of the gacha event information by using the encrypted hash value. Moreover, because the encrypted hash value is a unique value of the data, different pieces of data may not have the same hash value.

According to some embodiments, in the process of generating the Merkle tree, a hash reference (e.g., a first hash reference, a second hash reference, a third hash reference, and a fourth hash reference) indicating each of the data of gacha event information (e.g., first gacha event information, second gacha event information, third gacha event information, and fourth gacha event information) may be generated. When the hash reference is generated, a hash reference indicating a pair of hash references (e.g., a 12th hash reference indicating the first hash reference and the second hash reference, and a 34th hash reference indicating the third hash reference and the fourth hash reference) may be generated. Thereafter, an operation of generating the hash reference indicating a pair of hash references may be repeatedly performed to generate a single hash reference (e.g., a 1234th hash reference indicating the 12th hash reference and the 34th hash reference). That is, the Merkle tree may be a tree-shaped structure starting from the single hash reference and connected to each of the data of the gacha event information. The root of the Merkle tree may mean a single hash reference that is finally generated.

The timestamp may mean the time when an operation has started to verify the operation. The difficulty level may mean the restriction in the hash puzzle or operation verification. The nonce may mean a value in which a block hash value is adjusted to satisfy the restriction for operation verification.

Figure 17:
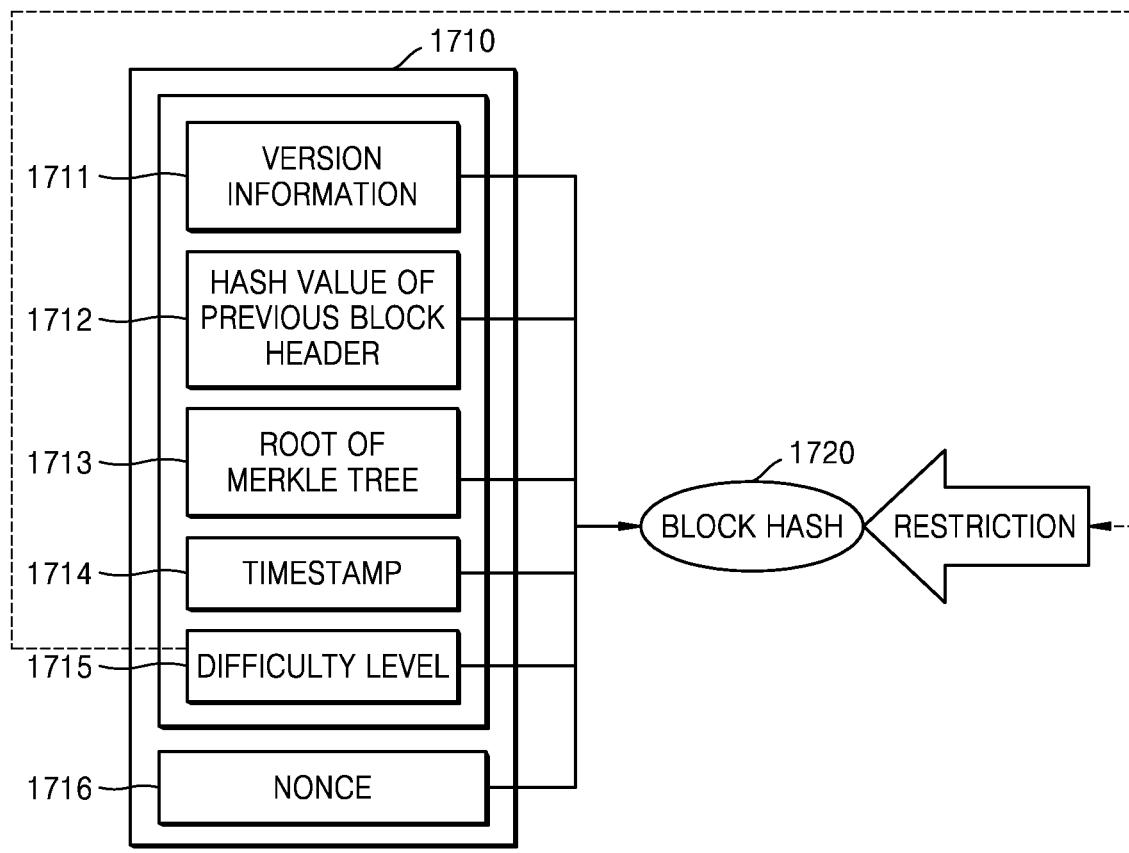
FIG. 17 is a diagram for describing a method of obtaining the operation verification and nonce of a block in a node on a blockchain network according to some embodiments.

FIG. 17 is a diagram for describing a method of obtaining the operation verification and nonce of a block in a node on a blockchain network according to some embodiments.

The nodes on the blockchain network may verify the validity of the gacha event information and the validity of the block header such that a valid block including only a block header and data of valid gacha event information may be connected to the blockchain.

Each of the nodes may generate a valid block by performing operation verification on the block. Here, the operation verification may mean solving a unique hash puzzle of the block.

According to some embodiments, an element 1710 for operation verification may include given data that should not be changed, freely-changeable data, a hash function to be applied, and a restriction given to the hash value. Here, the given data that should not be changed may include version information 1711, a hash value 1712 of the previous block header, a root 1713 of the Merkle tree, a timestamp 1714, and data about a difficulty level 1715. Also, the freely-changeable data may be a nonce 1716. Also, the restriction given to the hash value may be the difficulty level 1715.

As illustrated in FIG. 17, the operation verification may be performed when the value of a block hash 1720 generated by applying a hash function to the version information 1711, the hash value 1712 of the previous block header, the root 1713 of the Merkle tree, the timestamp 1714, the data about the difficulty level 1715, and the nonce 1716 satisfies the restriction.

Particularly, the node may guess the nonce 1716 for operation verification on the block and generate a value of the block hash 1720 by combining the guessed nonce 1716 with the version information 1711, the hash value 1712 of the previous block header, and the root 1713 of the Merkle tree, the timestamp 1714, and the data about the difficulty level 1715 and applying a hash function thereto. The node may determine whether the generated value of the block hash 1720 satisfies the restriction. When the value of the block hash 1720 satisfies the restriction, the operation verification is completed; however, when the value of the block hash 1720 does not satisfy the restriction, the node may repeat the same process after guessing another nonce.

Table 1730 of FIG. 17 illustrates a nonce, data to be hashed, a hash value generated by combining the nonce with the data to be hashed and applying the result to a hash function. For example, the restriction may be a condition in which the first three digits of the hash value are 0. The node may perform a process for operation verification while increasing the nonce from 0 to 1. Referring to Table 1730 of FIG. 17, a hash value (JYPEHJLF100) generated by using a nonce 53 satisfies the restriction. The node may complete the operation verification with 54 trials and errors from the nonce 0 to the nonce 53.

According to some embodiments, the difficulty level may mean the restriction in the hash puzzle or operation verification. The difficulty level may be represented as a natural number, and the number of the difficulty level may mean the number of digits to be filled with zero from the first digit of the hash value. Thus, as the difficulty level increases, the first digit to be filled with zero may increase. As the difficulty level increases, the operation verification or hash puzzle may be complex and more computational resources and time may be required to find a nonce that satisfies the restriction. That is, the operation verification may mean calculating a nonce value, acquiring a block hash value, and generating a valid block having the acquired block hash value as an identifier.

Also, according to some embodiments, the node that has generated the valid block may be rewarded. The reward may be determined under the agreement of the nodes on the blockchain network. Also, the reward may be determined by the agreement between the nodes and the game service provider, and the first user terminal providing the gacha event information to the first node may also be rewarded.

Figure 18:
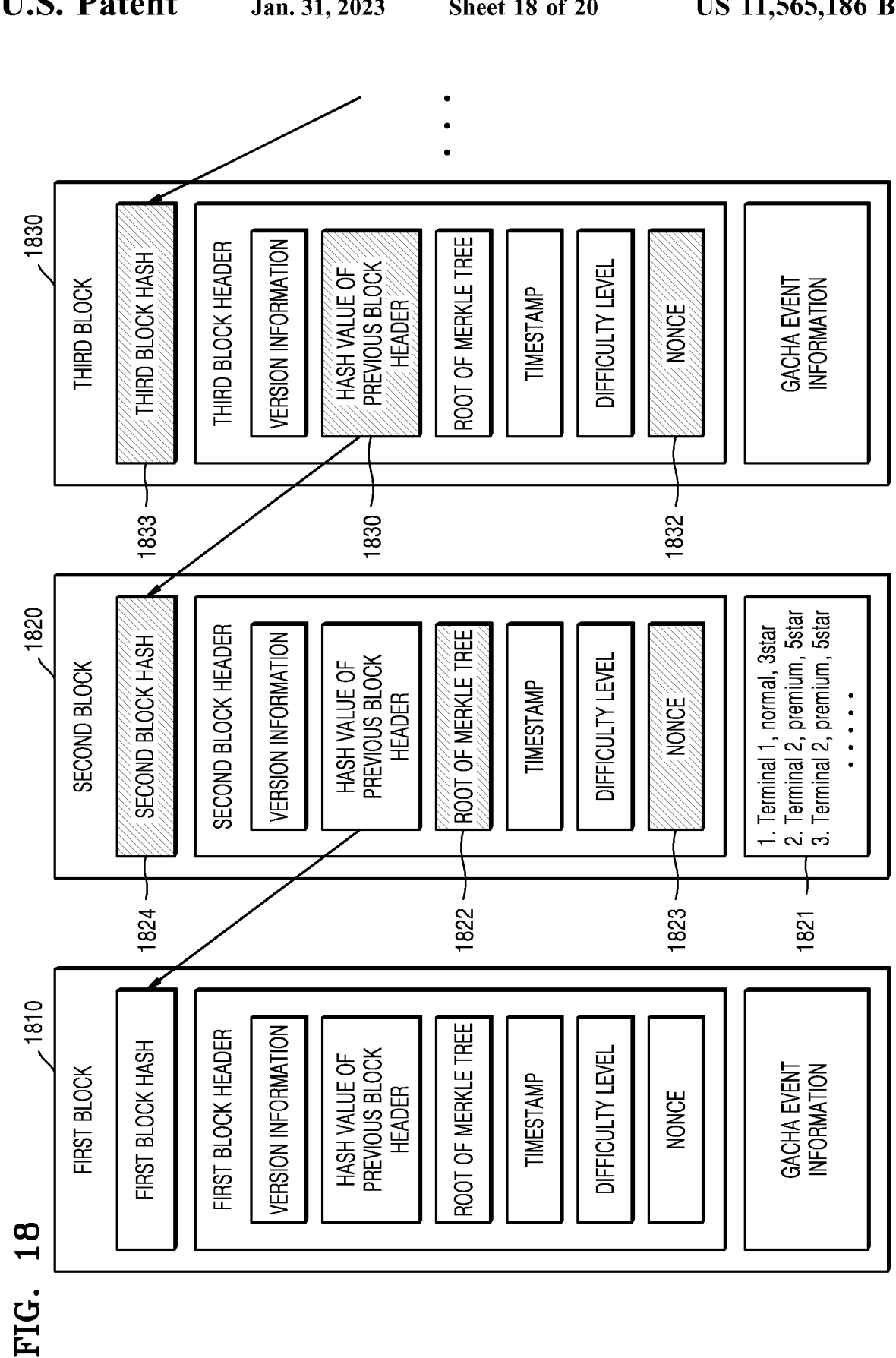
FIG. 18 is a diagram for describing a method of recording gacha event information in a blockchain according to some embodiments.

FIG. 18 is a diagram for describing a method of recording gacha event information in a blockchain according to some embodiments.

According to some embodiments, the hash value of the gacha event information may be used to calculate the root of the Merkle tree of the block including the gacha event information. Also, the root of the Merkle tree may be used to calculate the value of the block hash. The value of the block hash may be used as an input value to calculate the value of the block hash of the next block.

Particularly, the hash value of the gacha event information of a second block 1820 may be used as an input value to calculate the root of the Merkle tree of the second block 1820. Also, a second block hash 1824 that is a hash value of the second block header may be calculated by applying version information of the second block header, a hash value of the block header of a first block 1810, a root 1822 of the Merkle tree, a timestamp, a difficulty level, and a nonce 1823 as input values to a hash function. The second block hash 1824 may be used to calculate a hash value 1833 of the block header of a third block 1830.

Thus, as illustrated in FIG. 18, when certain gacha event information 1821 among the gacha event information of the second block 1820 is changed, the root 1822 of the Merkle tree of the second block header may be changed. When the root 1822 of the Merkle tree of the second block header is changed, the nonce 1823 of the second block header may be changed. Because the root 1822 of the Merkle tree of the second block header and the nonce 1823 of the second block header are changed, the second block hash 1824 may also be changed. Also, as the second block hash 1824 is changed, a hash value 1831, a nonce 1832, and a third block hash 1833 of the previous block header of the third block 1830 may also be changed.

That is, when the gacha event information recorded in the block is changed, because the root and nonce of the Merkle tree recorded in the block are changed, the hash value of the block header should be recalculated. Thereafter, the hash value of the block header of the next block should also be recalculated. Thus, while the operation verification is being performed from the block including the changed gacha event information after the gacha event information is changed in a certain node, blocks may be continuously added to the blockchain where the gacha event information is not changed in other nodes. Thus, the length of the blockchain possessed by a certain node may become smaller than the length of the blockchain possessed by other nodes.

Moreover, each of the nodes on the blockchain network may select the history of the gacha event information according to a certain criterion in order to provide consistency and security to the history of the gacha event information recorded on the blockchain. For example, the certain criterion may be used to select a path having the most blocks in the tree-shaped blockchain data structure. Also, the certain criterion may be used to select a path having the greatest sum in the tree-shaped blockchain data structure.

Thus, because the length of the blockchain possessing the block with the gacha event information changed is smaller than the length of the blockchain with the gacha event information unchanged, each of the nodes on the network of the blockchain may select the blockchain with the gacha event information unchanged, thereby ensuring the consistency and security in the history of the gacha event information recorded on the blockchain.

In addition to providing the gacha probability information through a method of storing data in the block in the blockchain described above, it may also be possible to provide a gacha system service or an online game service. By storing data for a gacha system service or an online game service instead of the gacha probability information, at least one node in the blockchain network or the blockchain network may provide a gacha system service or an online game service.

Also, according to some embodiments, the gacha system service or the online game service may be provided through a decentralized application (DAPP). A gacha system service and an online game service may be provided through the DAPP without intervention of the server. For example, the gacha engine may be stored in the blockchain network, the gacha event may be executed through the DAPP by using the stored gacha engine, and the execution result thereof may be provided. An online game service may also be provided in the same way as the method of providing the gacha system service.

Figure 19:
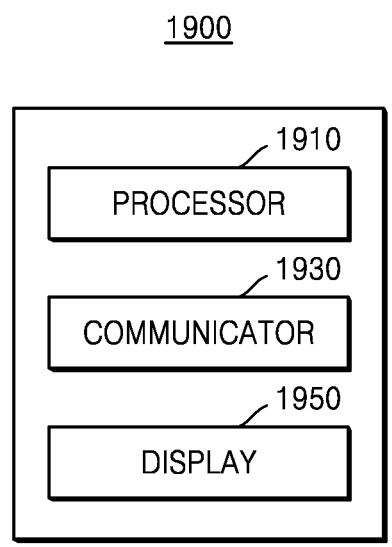
FIG. 19 is a block diagram illustrating a configuration of a user terminal according to some embodiments.

FIG. 19 is a block diagram illustrating a configuration of a user terminal according to some embodiments.

A user terminal 1900 of FIG. 19 may include a processor 1910, a communicator 1930, and a display 1950. However, not all components illustrated in FIG. 19 are necessary components of the user terminal 1900. The user terminal 1900 may be implemented by more components than the illustrated components, or may be implemented by less components than the illustrated components. The above components will be described below. Also, the user terminal 1900 illustrated in FIG. 19 may be the first user terminal 110 described above.

According to some embodiments, the processor 1910 may generally control an overall operation of the user terminal 1900. For example, the processor 1910 may control overall operations of the components included in the user terminal 1900 by executing the programs stored in the user terminal 1900. The processor 1910 may include at least one processor and may include at least one specialized processor corresponding to each function or may include a processor in the form of a single integral unit.

According to some embodiments, the processor 1910 may control the communicator 1930, the display 1950, and a memory (not illustrated). The processor 1910 may execute the program stored in the memory (not illustrated), read the data or files stored in the memory (not illustrated), or store a new file in the memory (not illustrated). Also, the processor 1910 may execute the instructions stored in the memory (not illustrated).

According to some embodiments, the processor 1910 may acquire probability information of the gacha system based on the gacha event information acquired from another user terminal. Also, the processor 1910 may generate first gacha event information based on the gacha event execution result.

According to some embodiments, the gacha event information may be included in the block constituting the blockchain that distributes and manages the ledger recording the gacha event information, and each gacha event information may be included in the same block or in different blocks among the blocks constituting the blockchain.

Also, according to some embodiments, the processor 1910 may control the communicator 1930 to request the record of the gacha event information including the gacha event execution result into at least one block constituting the blockchain to the node of the blockchain network.

Also, according to some embodiments, the processor 1910 may encrypt the gacha event information and control the communicator 1930 to transmit the encrypted gacha event information to the node.

According to some embodiments, the processor 1910 may generate a hash value corresponding to the gacha event information by applying the gacha event information to a hash function for generating unique data about the gacha event information and may generate a cryptogram representing a digital signature of the gacha event information by encrypting the hash value with a private key of the user that has executed the gacha event.

According to some embodiments, the processor 1910 may calculate the acquisition probability of each of the items acquirable in the gacha system based on the gacha event information acquired from the user terminal 1900 or another user terminal.

According to some embodiments, at least one of the account corresponding to the user terminal that has generated the gacha event information and the user account corresponding to the node that has generated the node may be provided with certain game goods.

According to some embodiments, the gacha event information may include at least one of the probability information of the gacha system, the game information related to the gacha system, the gacha event type, the gacha event execution time, the gacha event execution account information, the information of the user terminal in which the gacha event is executed, the item acquired according to the gacha event execution result, and the amount of game goods used to execute the gacha event.

According to some embodiments, the communicator 1930 may acquire information about the gacha event occurring in another user terminal. For example, the communicator 1930 may acquire the third gacha event information that is information about the gacha event occurring in the third user terminal.

Also, according to some embodiments, the communicator 1930 may transmit a gacha event execution request and acquire a gacha event execution result from the server. Also, the communicator 1930 may transmit a cryptogram obtained by encrypting the gacha event information to the node.

According to some embodiments, the communicator 1930 may include a Bluetooth communicator, a Bluetooth Low Energy (BLE) communicator, a near field communicator, a WLAN (WiFi) communicator, a ZigBee communicator, an infrared data association (IrDA) communicator, a WiFi Direct (WFD) communicator, an Ultra Wideband (UWB) communicator, or an Ant+ communicator; however, the present disclosure is not limited thereto.

Also, according to some embodiments, the communicator 1930 may transmit/receive wireless signals to/from at least one of a base station, an external terminal, and a server on a mobile communication network. Here, the wireless signals may include voice call signals, video call signals, or various types of data according to transmission/reception of text/ multimedia messages.

According to some embodiments, the display 1950 may display the probability information of the gacha system. Also, the display 1950 may display various screens output from the user terminal 1900. The display 1950 may include at least one of a liquid crystal display (LCD), a thin film transistor-liquid crystal display (TFT-LCD), an organic light-emitting diode (OLED) display, a flexible display, a three-dimensional (3D) display, and an electrophoretic display. When a display and a touch pad are configured as a touch screen by forming a layer structure, the display may be used as an input device in addition to an output device.

According to some embodiments, the user terminal 1900 may further include a user interface (not illustrated).

Also, according to some embodiments, the user interface (not illustrated) may acquire various user inputs. For example, the user interface (not illustrated) may acquire a user input for executing the gacha event or a user input for displaying the probability information of the gacha system. According to some embodiments, the user interface (not illustrated) may include a key pad, a dome switch, a touch pad (e.g., a capacitive overlay type, a resistive overlay type, an infrared beam type, a surface acoustic wave type, an integral strain gauge type, or a piezoelectric type), a jog wheel, or a jog switch; however, the present disclosure is not limited thereto.

According to some embodiments, the user terminal 1900 may further include a memory (not illustrated). The memory (not illustrated) may store various information, and the form stored in the memory (not illustrated) is not limited thereto.

According to some embodiments, the memory (not illustrated) may include at least one type of storage medium among flash memory type, hard disk type, multimedia card micro type, card type memory (e.g., SD and XD memories), random-access memory (RAM), static random-access memory (SRAM), read-only memory (ROM), electronically erasable programmable read-only memory (EEPROM), programmable read-only memory (PROM), magnetic memory, magnetic disk, and optical disk. Also, according to some embodiments, the programs stored in the memory (not illustrated) may be classified into a plurality of modules according to their functions.

Figure 20:
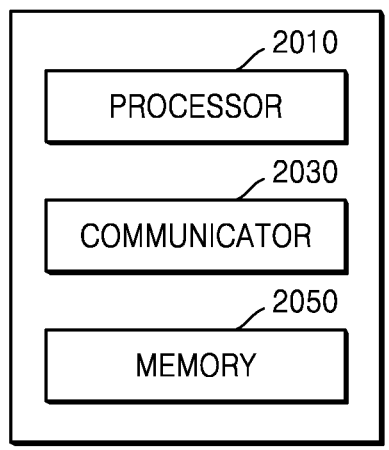
FIG. 20 is a block diagram illustrating a configuration of a node on a blockchain network according to some embodiments.

FIG. 20 is a block diagram illustrating a configuration of a node on a blockchain network according to some embodiments.

A node 2000 illustrated in FIG. 20 may include a processor 2010, a communicator 2030, and a memory 2050. However, not all components illustrated in FIG. 20 are necessary components of the node 2000. The node 2000 may be implemented by more components than the illustrated components, or may be implemented by less components than the illustrated components. The above components will be described below. The node 2000 illustrated in FIG. 20 may be the first node 210 described above.

According to some embodiments, the processor 2010 may generally control an overall operation of the node 2000. For example, the processor 2010 may control overall operations of the components included in the node 2000 by executing the programs stored in the node 2000. The processor 2010 may include at least one processor and may include at least one specialized processor corresponding to each function or may include a processor in the form of a single integral unit.

According to some embodiments, the processor 2010 may control the communicator 2030 and the memory 2050. The processor 2010 may execute the program stored in the memory 2050, read the data or files stored in the memory 2050, or store a new file in the memory 2050. Also, the processor 2010 may execute the instructions stored in the memory 2050.

According to some embodiments, the processor 2010 may receive the first gacha event information from the first user terminal through the communicator 2030. Also, the processor 2010 may receive information about the first gacha event from the server through the communicator 2030.

According to some embodiments, the processor 2010 may verify the validity of the first gacha event information based on the first gacha event information received from the first user terminal and the first gacha event information received from the server. When it is determined that the first gacha event information is valid, the processor 2010 may transmit the first gacha event information through the communicator 2030 to the second node on the network of the blockchain that distributes and manages the ledger recording the gacha event information. Also, the processor 2010 may add the first gacha event information to a candidate block. On the other hand, when it is determined that the first gacha event information is invalid, the processor 2010 may discard the first gacha event information.

According to some embodiments, the processor 2010 may perform operation verification on the candidate block and add the candidate block as a valid block to the blockchain.

According to some embodiments, the processor 2010 may receive, through the communicator 2030 from the first user terminal, first gacha event information performed by the first user terminal with the server and a first cryptogram representing a digital signature of the first gacha event information.

According to some embodiments, the processor 2010 may generate a first hash value corresponding to the first gacha event information by applying a hash function to the first gacha event information. The processor 2010 may generate a second hash value by decrypting the first cryptogram by using a public key of the first user. The processor 2010 may verify the validity of the first gacha event information based on the result of comparing the first hash value with the second hash value and whether the first gacha event information acquired from the server and the user terminal correspond to each other.

According to some embodiments, the processor 2010 may receive a first block of which operation verification is completed, through the communicator 2030 from the second node on the blockchain network. The processor 2010 may verify the validity of the first block by checking the validity of at least one piece of gacha event information included in the first block and the validity of the block header of the first block. When the first block is valid, the processor 2010 may add the first block to the blockchain of the first node 2000. When the first block is invalid, the processor 2010 may discard the first block and generate a valid block to be added to the blockchain of the first node.

According to some embodiments, the communicator 2030 may communicate with an external apparatus. Particularly, the communicator 2030 may be connected to the network by wire or wireless to communicate with the external apparatus. Here, the external apparatus may include a server, a smartphone, a tablet, a PC, a computing apparatus, or the like. The communicator 2030 may include a communication module that supports one of various wired/wireless communication methods. For example, the communication module may be in the form of a chipset or may be a sticker/barcode including information necessary for communication (e.g., a sticker including an NFC tag). Also, the communication module may include a short-range communication module or a wired communication module.

According to some embodiments, the communicator 2030 may communicate through any communication method such as Bluetooth, Bluetooth Low Energy (BLE), Near Field Communication, WLAN, ZigBee, Infrared Data Association (IrDA), Wi-Fi Direct (WFD), Ultra Wideband (UWB), Ant+, LTE, 3G, or 5G.

According to some embodiments, the memory 2050 may include at least one type of storage medium among flash memory type, hard disk type, multimedia card micro type, card type memory (e.g., SD or XD memory), random-access memory (RAM), static random-access memory (SRAM), read-only memory (ROM), electronically erasable programmable read-only memory (EEPROM), programmable read-only memory (PROM), magnetic memory, magnetic disk, and optical disk. The memory 2050 may store at least one program for executing, in a computer, an operation method of the node 2000 on the network of the blockchain that distributes and manages the ledger recording the gacha event information. At least one program stored in the memory 2050 may be classified into a plurality of modules according to functions.

The apparatuses described above may be implemented as hardware components, software components, and/or a combination of hardware components and software components. For example, the apparatuses and components described in the embodiments may be implemented by using one or more general-purpose computers or special-purpose computers such as processors, controllers, arithmetic logic units (ALUs), digital signal processors, microcomputers, field programmable gate arrays (FPGAs), programmable logic units (PLUs), microprocessors, or any other apparatuses capable of executing and responding to instructions. The processor may execute an operating system (OS) and one or more software applications that are executed on the OS. Also, the processor may access, store, operate, process, and generate data in response to execution of the software. For convenience of understanding, the processor may be described as being used singly; however, those of ordinary skill in the art will understand that the processor may include a plurality of processing elements and/or a plurality of types of processing elements. For example, the processor may include a plurality of processors or one processor and one controller. Also, other processing configurations such as parallel processors may also be possible.

The software may include computer programs, code, instructions, or a combination of one or more thereof and may configure the processor to operate as desired or may instruct the processor independently or collectively. In order to be interpreted by the processor or to provide instructions or data to the processor, software and/or data may be permanently or temporarily embodied in any type of machine, component, physical apparatus, virtual equipment, computer storage medium or apparatus, or transmitted signal wave. The software may be distributed over a network-coupled computer system to be stored or executed in a distributed manner. The software and data may be stored on one or more computer-readable recording mediums.

The method according to an embodiment may be embodied in the form of program instructions executable through various computer means, which may be recorded on a computer-readable recording medium. The computer-readable recording medium may include program instructions, data files, and data structures either alone or in combination. The program instructions recorded on the computer-readable recording medium may be those that are especially designed and configured for the embodiment, or may be those that are known and available to those of ordinary skill in computer software. Examples of the computer-readable recording medium include magnetic media such as hard disks, floppy disks, and magnetic tapes, optical media such as CD-ROMs and DVDs, and magneto-optical media such as floptical disks, and hardware apparatuses such as ROMs, RAMs, and flash memories particularly configured to store and execute program instructions. Examples of the program instructions may include not only machine language code generated by a compiler but also high-level language code that may be executed by a computer by using an interpreter or the like. The hardware apparatus described above may be configured to operate as one or more software modules in order to perform the operation of an embodiment, and vice versa.

While the present disclosure has been described with reference to the drawings and particular embodiments, those of ordinary skill in the art may make various changes and modifications therein without departing from the spirit and scope of the present disclosure. For example, the described technologies may be performed in a different order than the described method, and/or the described components such as systems, structures, apparatuses, and circuits may be united or combined in a different form than the described method or may be replaced or substituted by other components or equivalents thereof.

Therefore, other implementations, other embodiments, and equivalents of the following claims are also within the scope of the following claims.

The invention claimed is:

1. A method of acquiring probability information of a gacha system by a first user terminal, the method comprising:
  generating, by a processor of the first user terminal, a first gacha event information about a first gacha event;
  encrypting, by the processor of the first user terminal, the first gacha event information;
  transmitting, by a communicator of the first user terminal, the encrypted first gacha event information to a first node;

acquiring, by the communicator, second gacha event information that is information about a second gacha event occurring in a second user terminal;

acquiring, by the communicator, a third gacha event information that is information about a third gacha event occurring in a third user terminal, wherein the second gacha event occurring in a second user terminal is different from the third gacha event occurring in the third user terminal;

acquiring, by the processor, probability information of the gacha system based on the acquired second gacha event information and third gacha event information; and displaying, by a display of the first user terminal, the acquired probability information of the gacha system.

2. The method of claim 1, further comprising:

transmitting a gacha event execution request;

acquiring an execution result of the first gacha event; and wherein generating the first gacha event information is based on the execution result.

3. The method of claim 2, wherein the second gacha event information is included in a block constituting a blockchain that distributes and manages a ledger recording gacha event information, and the third gacha event information is included in the block or a block different from the block among blocks constituting the blockchain.

4. The method of claim 3, wherein the generating of the first gacha event information comprises requesting a record of the first gacha event information into at least one block constituting the blockchain to a first node on a blockchain network.

5. The method of claim 4, wherein the requesting of the record of the first gacha event information to the first node comprises encrypting the first gacha event information and transmitting the encrypted first gacha event information to the first node.

6. The method of claim 1, wherein the transmitting of the first gacha event information to the first node comprises:

generating a first hash value corresponding to the first gacha event information by applying the first gacha event information to a hash function for generating unique data about the first gacha event information;

generating a first cryptogram representing a digital signature of the first gacha event information by encrypting the first hash value with a private key of a user that has executed the gacha event; and transmitting the first cryptogram together with the first gacha event information to the first node.

7. The method of claim 1, wherein the second gacha event information or the third gacha event information includes at least one of probability information of the gacha system, game information related to the gacha system, a gacha event type, a gacha event execution time, gacha event execution account information, information of a user terminal in which a gacha event is executed, an item acquired according to a gacha event execution result, and the amount of game goods used to execute a gacha event.

8. The method of claim 1, wherein the acquiring of the probability information of the gacha system comprises calculating an acquisition probability of each of items acquirable in the gacha system, based on the second gacha event information and the third gacha event information.

9. The method of claim 4, wherein at least one of an account corresponding to a user terminal that has generated the first gacha event information and a user account corresponding to the first node is provided with certain game goods.

10. The method of claim 1, further comprising:

updating the acquired probability information of the gacha system based on additionally-acquired gacha event information; and displaying the updated probability information of the gacha system.

11. An apparatus for acquiring probability information of a gacha system, the apparatus comprising:

a communicator configured to acquire second gacha event information that is information about a second gacha event occurring in a second user terminal and to acquire third gacha event information that is information about a third gacha event occurring in a third user terminal, wherein the second gacha event occurring in the second user terminal is different from the third gacha event occurring in the third user terminal;

a processor configured to:

acquire probability information of the gacha system based on the acquired second gacha event information and third gacha event information;

generate a first gacha event information about a first gacha event;

encrypt the first gacha event information; and control the communicator to send the encrypted gacha event information to a first node; and a display configured to display the acquired probability information of the gacha system.

12. The apparatus of claim 11, wherein the communicator transmits a gacha event execution request and acquires an execution result of the gacha event, and the processor generates the first gacha event information based on the execution result.

13. The apparatus of claim 12, wherein the second gacha event information is included in a block constituting a blockchain that distributes and manages a ledger recording gacha event information, and the third gacha event information is included in the block or a block different from the block among blocks constituting the blockchain.

14. The apparatus of claim 13, wherein the processor controls the communicator to request a record of the first gacha event information into at least one block constituting the blockchain to a first node on a blockchain network.

15. The apparatus of claim 11, wherein the processor generates a first hash value corresponding to the first gacha event information by applying the first gacha event information to a hash function for generating unique data about the first gacha event information and generates a first cryptogram representing a digital signature of the first gacha event information by encrypting the first hash value with a private key of a user that has executed the gacha event, and the communicator transmits the first cryptogram together with the first gacha event information to the first node.

16. The apparatus of claim 11, wherein the second gacha event information or the third gacha event information includes at least one of probability information of the gacha system, game information related to the gacha system, a gacha event type, a gacha event execution time, gacha event execution account information, information of a user terminal in which a gacha event is executed, an item acquired according to a gacha event execution result, and the amount of game goods used to execute a gacha event.

17. The apparatus of claim 11, wherein the processor calculates an acquisition probability of each of items acquirable in the gacha system, based on the second gacha event information and the third gacha event information.

\* \* \* \* \*